US012664407B2

(12) United States Patent
Yan et al.

(10) Patent No.: US 12,664,407 B2
(45) Date of Patent: Jun. 23, 2026

(54) RESOURCE-EFFICIENT ATTENTION IN A NEURAL NETWORK

(71) Applicant: Microsoft Technology Licensing, LLC, Redmond, WA (US)

(72) Inventors: Yu Yan, Bellevue, WA (US); Jiusheng Chen, Kirkland, WA (US); Nikhil Bhendawade, Cupertino, CA (US); Yeyun Gong, Beijing (CN); Nan Duan, Beijing (CN); Ruofei Zhang, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1399 days.

(21) Appl. No.: 17/221,791

(22) Filed: Apr. 3, 2021

(65) Prior Publication Data

US 2022/0318601 A1     Oct. 6, 2022

(51) Int. Cl.
*G06N 3/047* (2023.01)
*G06N 3/045* (2023.01)
(52) U.S. Cl.
CPC ............. *G06N 3/047* (2023.01); *G06N 3/045* (2023.01)
(58) Field of Classification Search
CPC ......... G06N 3/047; G06N 3/045; G06N 20/00
See application file for complete search history.

(56) References Cited

U.S. PATENT DOCUMENTS

| | | | |
|---|---|---|---|
| 11,074,412 B1* | 7/2021 | Leeman-Munk | G06F 40/284 |
| 2021/0201044 A1* | 7/2021 | Herdade | G06T 11/20 |
| 2022/0261555 A1* | 8/2022 | Lebanoff | G06F 40/216 |

OTHER PUBLICATIONS

Vaswani et al, "Attention Is All You Need", 2017, 31st Conference on Neural Information Processing Systems (NIPS 2017), pp. 1-11. (Year: 2017).*
Cordonnier et al, "Multi-Head Attention: Collaborate Instead of Concatenate", 2020, arXiv:2006.16362v1, pp. 1-11. (Year: 2020).*
Yan, et al., "EL-Attention: Memory Efficient Lossless Attention for Generation," in Proceedings of the 38th International Conference on Machine Learning, PMLR 139, Jul. 2021, 11 pages.
Alammar, Jay, "The Illustrated Transformer," available at http://jalammar.github.io/illustrated-transformer/, Github, Jun. 27, 2018, 23 pages.
Beltagy, et al., "Longformer: The Long-Document Transformer," arXiv:2004.05150v2 [cs.CL], Dec. 2, 2020, 17 pages.
(Continued)

*Primary Examiner* — Alexey Shmatov
*Assistant Examiner* — Clint Mullinax

(57) ABSTRACT

Computing technology is described herein that provides an attention mechanism, implemented by a neural network, that generates attention information based on head-specific query information and shared key and value (KV) information, without computing head-specific key information and head-specific value information, and without caching the head-specific key information and the head-specific value information in memory. This manner of operation allows the computing technology to make efficient use of processing and memory resources. In some implementations, the attention mechanism is part of decoder of an encoder-decoder system, or a standalone decoder system. In some implementations, the computing technology leverages the attention information to generate synthesized text based on input text.

19 Claims, 11 Drawing Sheets

(56) References Cited

OTHER PUBLICATIONS

Bhojanapalli, et al., "Low-Rank Bottleneck in Multi-head Attention Models," in Proceedings of the 37th International Conference on Machine Learning, Online, PMLR 119, Jul. 2020, 10 pages.

Brown, et al., "Language Models are Few-Shot Learners," arXiv:2005. 14165v4 [cs.CL], Jul. 22, 2020, 75 pages.

Cho, et al., "X-LXMERT: Paint, Caption and Answer Questions with Multi-Modal Transformers," arXiv:2009.11278v1 [cs.CV], Sep. 23, 2020, 21 pages.

Fan, et al., "Reducing Transformer Depth on Demand with Structured Dropout," arXiv:1909.11556v1 [cs.LG], Sep. 25, 2019, 15 pages.

Goyal, et al., "PoWER-BERT: Accelerating BERT Inference via Progressive Word-vector Elimination," in Proceedings of the 37th International Conference on Machine Learning, PMLR 119, Jul. 2020, 10 pages.

Gu, et al., "Non-Autoregressive Neural Machine Translation," arXiv:1711.02281v2 [cs.CL], Mar. 9, 2018, 13 pages.

Hermann, et al., "Teaching Machines to Read and Comprehend," in Proceedings of the 28th International Conference on Neural Information Processing Systems, vol. 1, Dec. 2015, 9 pages.

Huang, et al., "Music Transformer: Generating Music with Long-Term Structure," arXiv:1809.04281v3 [cs.LG], Dec. 12, 2018, 14 pages.

Katharopoulos, et al., "Transformers are RNNs: Fast Autoregressive Transformers with Linear Attention," in Proceedings of the 37th International Conference on Machine Learning, Online, PMLR 119, Jul. 2020, 10 pages.

Kitaev, et al., "Reformer: The Efficient Transformer," arXiv:2001. 04451v2 [cs.LG], Feb. 18, 2020, 12 pages.

Lee, et al., "Deterministic Non-Autoregressive Neural Sequence Modeling by Iterative Refinement," arXiv:1802.06901v3 [cs.LG], Aug. 27, 2018, 11 pages.

Lewis, et al., "BART: Denoising Sequence-to-Sequence Pre-training for Natural Language Generation, Translation, and Comprehension," in Proceedings of the 58th Annual Meeting of the Association for Computational Linguistics, Jul. 2020, pp. 7871-7880.

Liu, et al., "GLGE: A New General Language Generation Evaluation Benchmark," arXiv:2011.11928v1 [cs.CL], Nov. 24, 2020, 11 pages.

Narayan, et al., "Don't Give Me the Details, Just the Summary! Topic-Aware Convolutional Neural Networks for Extreme Summarization," in Proceedings of the 2018 Conference on Empirical Methods in Natural Language Processing, 2018, pp. 1797-1807.

Ott, et al., "fairseq: A Fast, Extensible Toolkit for Sequence Modeling," in Proceedings of the 2019 Conference of the North American Chapter of the Association for Computational Linguistics (Demonstrations), Jun. 2019, pp. 48-53.

Parmar, et al., "Image Transformer.," in Proceedings of the 35th International Conference on Machine Learning, PMLR 80, 2018, 10 pages.

Qi, et al., "BANG: Bridging Autoregressive and Non-autoregressive Generation with Large Scale Pretraining," arXiv:2012.15525v2 [cs.CL], Feb. 18, 2021, 12 pages.

Radford, et al., "Language Models are Unsupervised Multitask Learners," available at https://openai.com/blog/better-language-models/in, in OpenAI blog, Feb. 2019, 24 pages.

Raffel, et al., "Exploring the Limits of Transfer Learning with a Unified Text-to-Text Transformer," arXiv:1910.10683v3 [cs.LG], Jul. 28, 2020, 67 pages.

Rajpurkar, et al., "SQuAD: 100,000+ Questions for Machine Comprehension of Text," in Proceedings of the 2016 Conference on Empirical Methods in Natural Language Processing, Nov. 2016, pp. 2383-2392.

Shazeer, et al., "Fast Transformer Decoding: One Write-Head is All You Need," arXiv:1911.02150v1 [cs.NE], Nov. 6, 2019, 9 pages.

Shleifer, et al., "Pre-trained Summarization Distillation," in arXiv:2010. 13002v2 [cs.CL], Oct. 28, 2020, 10 pages.

Tay, et al., "Sparse Sinkhorn Attention," in Proceedings of the 37th International Conference on Machine Learning, PMLR 119, Jul. 2020, 10 pages.

Tay, et al., "Long Range Arena: A Benchmark for Efficient Transformers," arXiv:2011.04006v1 [cs.LG], Nov. 8, 2020, 16 pages.

Vaswani, et al., "Attention is All you Need," in Advances in Neural Information Processing Systems 30 (NIPS 2017), 2017, 11 pages.

Vaswani, et al., "Tensor2Tensor for Neural Machine Translation," arXiv:1803.07416v1 [cs.LG], Mar. 16, 2018, 9 pages.

Wang, et al., "Linformer: Self-Attention with Linear Complexity," arXiv:2006.04768v3 [cs.LG], Jun. 14, 2020, 12 pages.

Wang, et al., "Hierarchical Roofline Performance Analysis for Deep Learning Applications," in arXiv:2009.05257v4 [cs.DC], Nov. 25, 2020, 9 pages.

Wang, et al., "Benchmarking TPU, GPU, and CPU Platforms for Deep Learning," arXiv:1907.10701v4 [cs.LG], Oct. 22, 2019, 13 pages.

Williams, et al. "Roofline: An Insightful Visual Performance Model for Multicore Architectures," in Communications of the ACM, 52(4), Apr. 2009, pp. 65-76.

Wolf, et al., "Transformers: State-of-the-Art Natural Language Processing," in Proceedings of the 2020 Conference on Empirical Methods in Natural Language Processing: System Demonstrations, Oct. 2020, pp. 38-45.

Yang, et al., "Hierarchical Roofline Analysis for GPUs: Accelerating Performance Optimization for the NERSC-9 Perlmutter System," in Concurrency and Computation: Practice and Experience, vol. 32, Issue 20, 2019, 12 pages.

Zaheer, et al., "Big Bird: Transformers for Longer Sequences," arXiv:2007.14062v2 [cs.LG], Jan. 8, 2021, 42 pages.

"Beam search," available at https://en.wikipedia.org/wiki/Beam_ search, Wikipedia article, accessed on Feb. 27, 2021, 3 pages.

Khandelwal, Renu, "An intuitive explanation of Beam Search," available at https://towardsdatascience.com/an-intuitive-explanation-of-beam-search-9b1d744e7a0f, in Medium: Towards Data Science, Feb. 1, 2020, 9 pages.

Radford, et al., "Improving Language Understanding by Generative Pre-Training," available at https://openai.com/blog/language-unsupervised/, in OpenAI Blog, Jun. 2018, 12 pages.

Alammar, Jay, "The Illustrated GPT-2 (Visualizing Transformer Language Models)," available at https://jalammar.github.io/illustrated-gpt2/, Github, Aug. 12, 2019, 43 pages.

Ba, et al., "Layer Normalization," arXiv:1607.06450v1 [stat.ML], Jul. 21, 2016, 14 pages.

Yan, et al., "EL-Attention: Memory Efficient Lossless Attention for Generation," arXiv:2105.04779v1 [cs.CL], May 11, 2021, 11 pages.

Irie, et al., "How Much Self-Attention Do We Need? Trading Attention for Feed-Forward Layers," in IEEE International Conference on Acoustics, Speech and Signal Processing (ICASSP), May 2020, pp. 6154-6158.

PCT and Search Report in PCT/US2022/020661, mailed on Jul. 19, 2022, 12 pages.

* cited by examiner

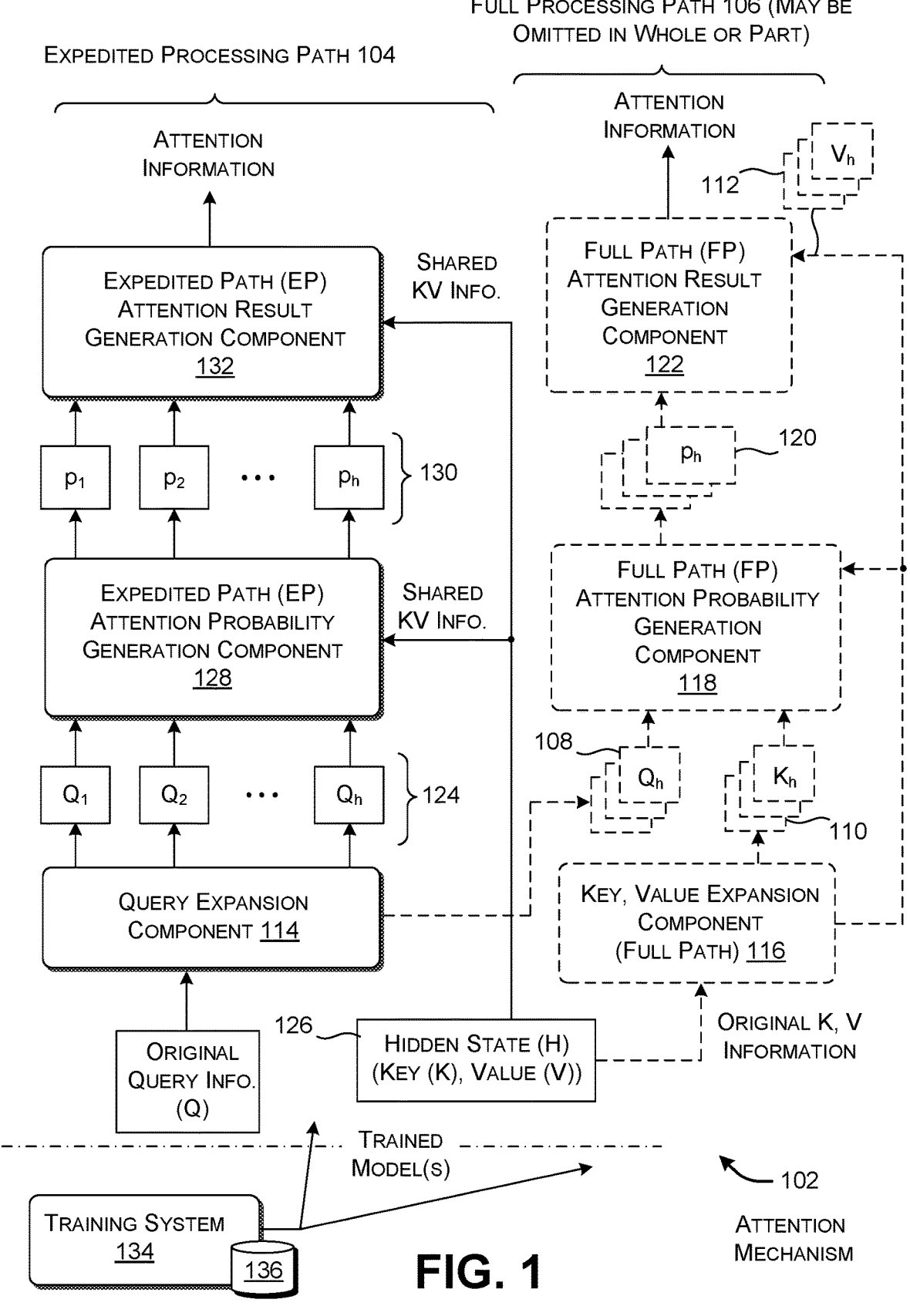

EXPEDITED PROCESSING PATH 104

FULL PROCESSING PATH 106 (MAY BE OMITTED IN WHOLE OR PART)

ATTENTION INFORMATION

ATTENTION INFORMATION

EXPEDITED PATH (EP) ATTENTION RESULT GENERATION COMPONENT 132

SHARED KV INFO.

FULL PATH (FP) ATTENTION RESULT GENERATION COMPONENT 122

$V_h$

112

$p_1$   $p_2$   $\cdots$   $p_h$

130

EXPEDITED PATH (EP) ATTENTION PROBABILITY GENERATION COMPONENT 128

SHARED KV INFO.

$p_h$

120

FULL PATH (FP) ATTENTION PROBABILITY GENERATION COMPONENT 118

$Q_1$   $Q_2$   $\cdots$   $Q_h$

124

108   $Q_h$      $K_h$

110

QUERY EXPANSION COMPONENT 114

KEY, VALUE EXPANSION COMPONENT (FULL PATH) 116

126

ORIGINAL QUERY INFO. (Q)

HIDDEN STATE (H) (KEY (K), VALUE (V))

ORIGINAL K, V INFORMATION

TRAINED MODEL(S)

102

TRAINING SYSTEM 134

ATTENTION MECHANISM

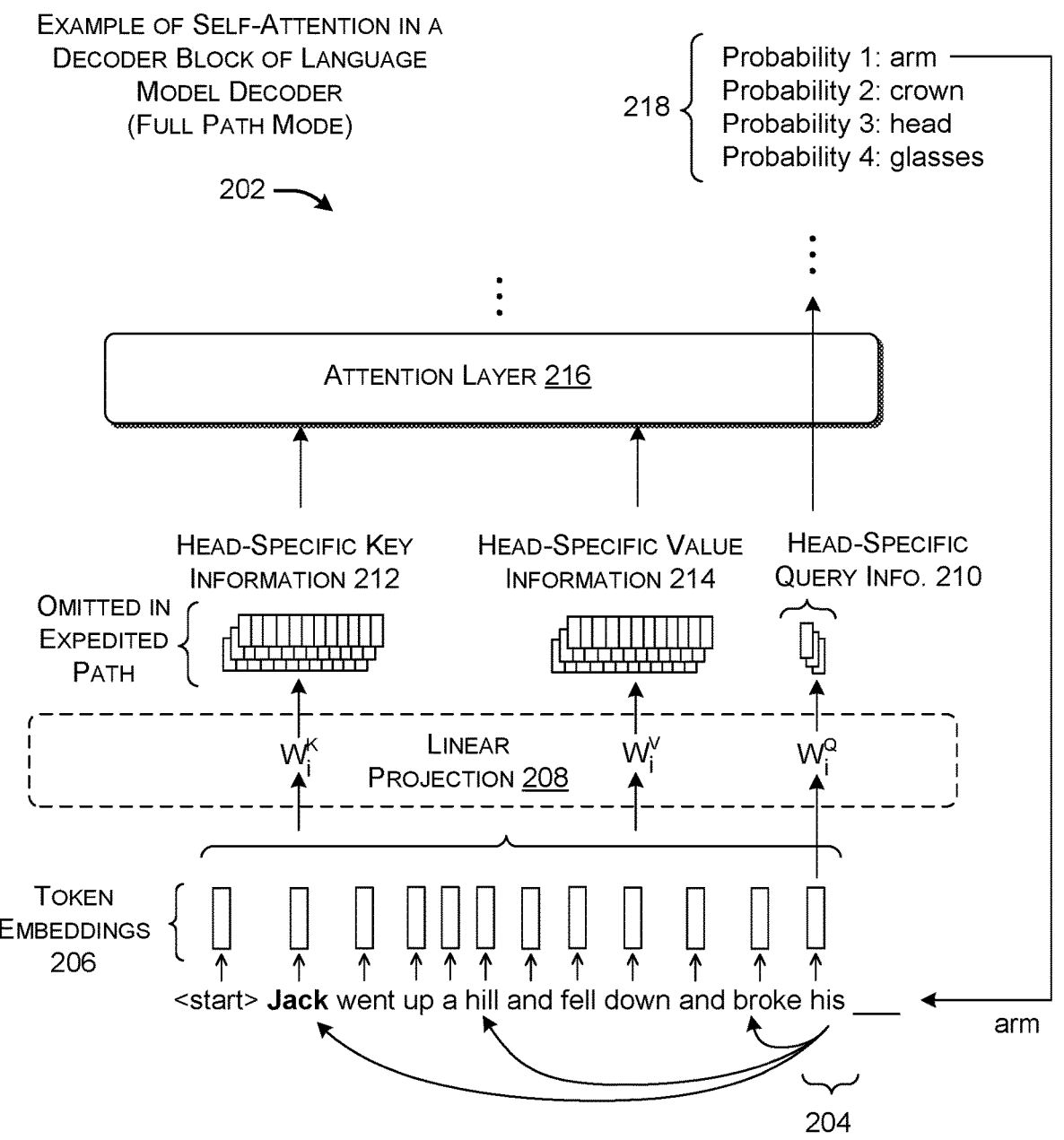

EXAMPLE OF SELF-ATTENTION IN A
DECODER BLOCK OF LANGUAGE
MODEL DECODER
(FULL PATH MODE)

202

218 {
Probability 1: arm
Probability 2: crown
Probability 3: head
Probability 4: glasses

ATTENTION LAYER 216

HEAD-SPECIFIC KEY
INFORMATION 212

HEAD-SPECIFIC VALUE
INFORMATION 214

HEAD-SPECIFIC
QUERY INFO. 210

OMITTED IN
EXPEDITED
PATH $W_i^K$      LINEAR      $W_i^V$      $W_i^Q$
PROJECTION 208

TOKEN
EMBEDDINGS
206

<start> Jack went up a hill and fell down and broke his ___      arm

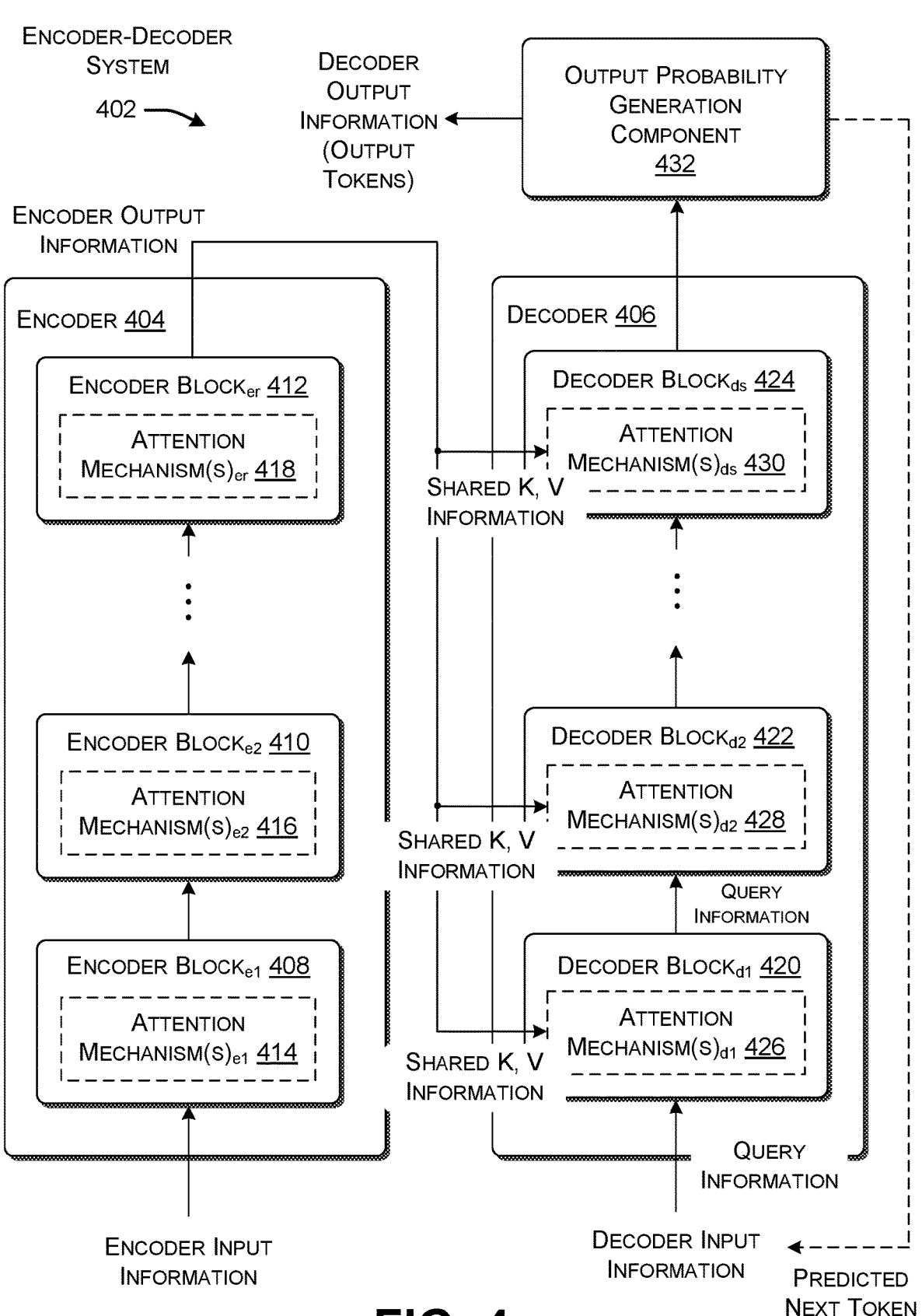

ENCODER-DECODER SYSTEM

402

DECODER OUTPUT INFORMATION (OUTPUT TOKENS)

OUTPUT PROBABILITY GENERATION COMPONENT 432

ENCODER OUTPUT INFORMATION

ENCODER 404

ENCODER BLOCK$_{er}$ 412

ATTENTION MECHANISM(S)$_{er}$ 418

DECODER 406

DECODER BLOCK$_{ds}$ 424

ATTENTION MECHANISM(S)$_{ds}$ 430

SHARED K, V INFORMATION

ENCODER BLOCK$_{e2}$ 410

ATTENTION MECHANISM(S)$_{e2}$ 416

DECODER BLOCK$_{d2}$ 422

ATTENTION MECHANISM(S)$_{d2}$ 428

SHARED K, V INFORMATION

QUERY INFORMATION

ENCODER BLOCK$_{e1}$ 408

ATTENTION MECHANISM(S)$_{e1}$ 414

DECODER BLOCK$_{d1}$ 420

ATTENTION MECHANISM(S)$_{d1}$ 426

SHARED K, V INFORMATION

ENCODER INPUT INFORMATION

DECODER INPUT INFORMATION

QUERY INFORMATION

PREDICTED NEXT TOKEN

FIG. 4

ILLUSTRATIVE
ENCODER BLOCK
502

ILLUSTRATIVE
DECODER BLOCK
602

STANDALONE DECODER SYSTEM

702

OUTPUT PROBABILITY GENERATION COMPONENT
716

DECODER BLOCK$_{ds}$ 708

ATTENTION MECHANISM(S)$_{ds}$ 714

DECODER BLOCK$_{d2}$ 706

ATTENTION MECHANISM(S)$_{d2}$ 712

DECODER BLOCK$_{d1}$ 704

ATTENTION MECHANISM(S)$_{d1}$ 710

INPUT TOKENS + OUTPUT TOKENS

NEXT TOKEN OF OUTPUT INFORMATION

INPUT TEXT
(E.G., QUERY)

SYNTHESIZED
TEXT

TEXT-GENERATION
SYSTEM 1004

ATTENTION
MECHANISM(S)
1010

1002

SYNTHESIZED TEXT (E.G.,
ANSWER, KEYWORD(S),
REFORMULATED QUERY, ETC.)

ANY DOWNSTREAM
SYSTEM(S), E.G.,
SEARCH ENGINE,
AD-GENERATING
ENGINE, DIALOGUE
SYSTEM, ETC.
1006

1008

SEARCH RESULTS,
AD(S), ANSWER, ETC.

Overview of Operation of the Attention mechanism 1102

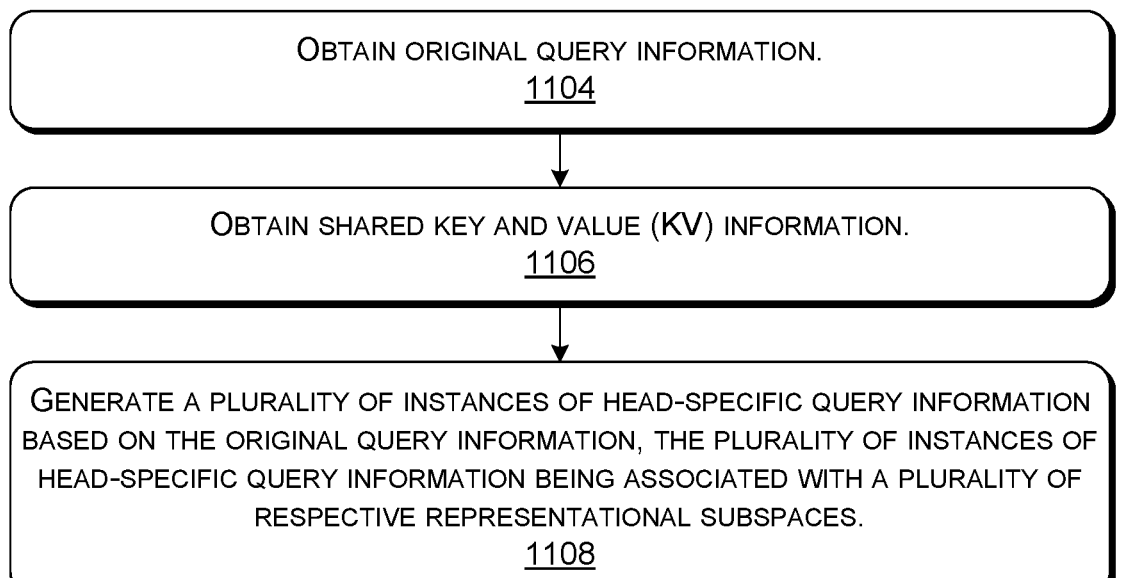

OBTAIN ORIGINAL QUERY INFORMATION.
1104

OBTAIN SHARED KEY AND VALUE (KV) INFORMATION.
1106

GENERATE A PLURALITY OF INSTANCES OF HEAD-SPECIFIC QUERY INFORMATION BASED ON THE ORIGINAL QUERY INFORMATION, THE PLURALITY OF INSTANCES OF HEAD-SPECIFIC QUERY INFORMATION BEING ASSOCIATED WITH A PLURALITY OF RESPECTIVE REPRESENTATIONAL SUBSPACES.
1108

GENERATE A PLURALITY OF INSTANCES OF PROBABILITY INFORMATION BASED ON A PRODUCT OF THE PLURALITY OF RESPECTIVE INSTANCES OF HEAD-SPECIFIC QUERY INFORMATION AND THE SHARED KV INFORMATION.
1110

GENERATE THE ATTENTION INFORMATION BASED ON THE PLURALITY OF INSTANCES OF PROBABILITY INFORMATION AND THE SHARED KV INFORMATION, THE ATTENTION INFORMATION EXPRESSING AN AMOUNT OF ATTENTION TO BE PAID TO DIFFERENT PARTS OF THE SHARED KV INFORMATION IN INTERPRETING THE ORIGINAL QUERY INFORMATION, THE GENERATING OF THE PLURALITY OF INSTANCES OF PROBABILITY INFORMATION AND THE GENERATING OF THE ATTENTION INFORMATION BEING PERFORMED USING A NEURAL NETWORK, AND BEING PERFORMED WITHOUT CACHING A PLURALITY OF INSTANCES OF HEAD-SPECIFIC KEY INFORMATION AND A PLURALITY OF INSTANCES OF HEAD-SPECIFIC VALUE INFORMATION IN MEMORY, AND WITHOUT GENERATING THE PLURALITY OF INSTANCES OF THE HEAD-SPECIFIC KEY INFORMATION AND THE PLURALITY OF INSTANCES OF HEAD-SPECIFIC VALUE INFORMATION.
1112

FIG. 11

GENERATING SYNTHESIZED TEXT USING THE PROCESS OF FIG. 11 (1202)

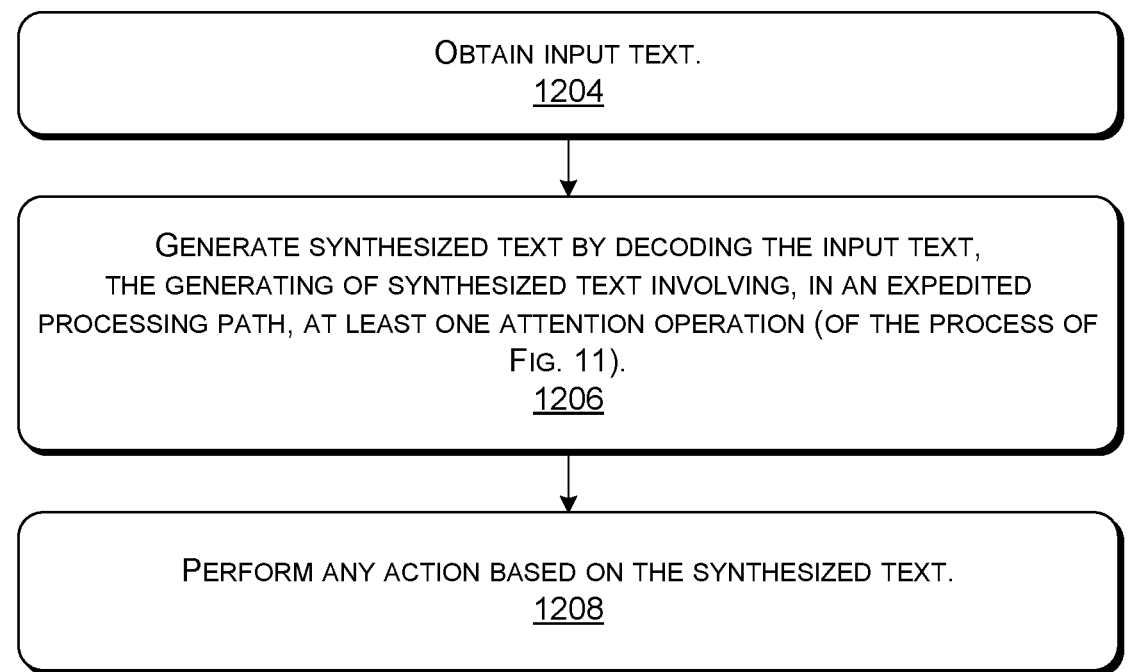

OBTAIN INPUT TEXT.
1204

GENERATE SYNTHESIZED TEXT BY DECODING THE INPUT TEXT,
THE GENERATING OF SYNTHESIZED TEXT INVOLVING, IN AN EXPEDITED
PROCESSING PATH, AT LEAST ONE ATTENTION OPERATION (OF THE PROCESS OF
FIG. 11).
1206

PERFORM ANY ACTION BASED ON THE SYNTHESIZED TEXT.
1208

FIG. 12

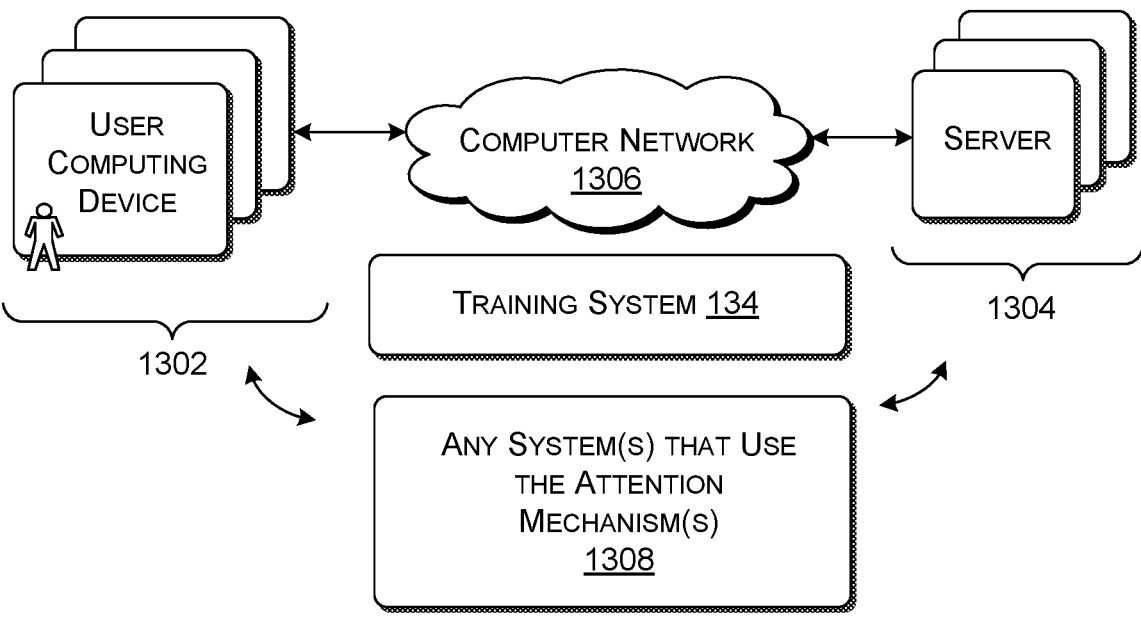

USER
COMPUTING
DEVICE

COMPUTER NETWORK
1306

SERVER

1302

1304

TRAINING SYSTEM 134

ANY SYSTEM(S) THAT USE
THE ATTENTION
MECHANISM(S)
1308

FIG. 13

RESOURCE-EFFICIENT ATTENTION IN A NEURAL NETWORK

BACKGROUND

Some neural networks incorporate one or more attention mechanisms. Consider, for instance, a neural network that uses a self-attention mechanism to process each word of a sentence. When interpreting a particular word in the sentence, the self-attention mechanism informs the neural network how much focus should be placed on each other word in the sentence. For example, when processing a word "it" in a sentence, the self-attention mechanism can inform the neural network that it should place the most weight on another word "car," because, in this illustrative sentence, "it" likely refers to "car".

While an attention mechanism provides useful insight, it performs complex and data-intensive operations. For instance, a neural network can incorporate plural attention mechanisms that operate in plural respective stages. At each stage, an attention mechanism includes plural "heads" that perform operations with respect to plural representational subspaces. Finally, in one common formulation, each head performs data-intensive operations with respect to query information, key information, and value information (each of which will be explained below). The complexity of these operations can place a significant burden on the processing and memory resources of a computing system that implements the neural network.

SUMMARY

Computing technology is described herein that includes an attention mechanism, implemented by a neural network, that generates attention information based on head-specific query information and shared key and value (KV) information, without caching head-specific key information and head-specific value information in memory, and without even generating the head-specific key information and the head-specific value information. This manner of operation allows the computing technology to make efficient use of processing and memory resources. For instance, this manner of operation reduces the amount of information that the computing technology stores in memory in the course of an attention operation, and reduces the amount of memory manipulation operations the computing technology performs in the course of the attention operation. It also avoids the computation-intensive operation of generating the head-specific key information and the head-specific value information.

In some implementations, the attention mechanism is part of a decoder. In some cases, the decoder is part of an encoder-decoder system. In other cases, the decoder is a standalone decoder system that does not include an encoder.

In some implementations, the computing technology leverages the attention information to generate synthesized text based on input text. For example, the computing system leverages the attention information to generate keyword information based on a submitted query, or to generate a summary of text contained in an identified web page. Many other applications are possible.

The above-summarized technology can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 1 shows an illustrative attention mechanism that makes use of an expedited processing path.

FIG. 2 shows an example of a self-attention operation performed by a decoder using a full processing path. This example primarily serves to introduce the concepts of query information, key information, and value information.

FIG. 4 shows an encoder-decoder system that can incorporate the attention mechanism of FIG. 1.

FIG. 11 is a flowchart that summarizes one manner of operation of the attention mechanism of FIG. 1.

FIG. 12 is a flowchart that summarizes some applications of the attention mechanism of FIG. 1.

FIG. 13 shows computing equipment that can be used to implement any aspect of the features shown in the foregoing drawings.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an attention mechanism for performing attention in a neural network. Section A also describes various systems that make use of the attention mechanism. Section B sets forth illustrative methods that explain the operation of the attention mechanism and systems of Section A. And Section C describes illustrative computing functionality that can be used to implement any aspect of the features described in Sections A and B.

A. Illustrative Computing System

Figures 8, 9:
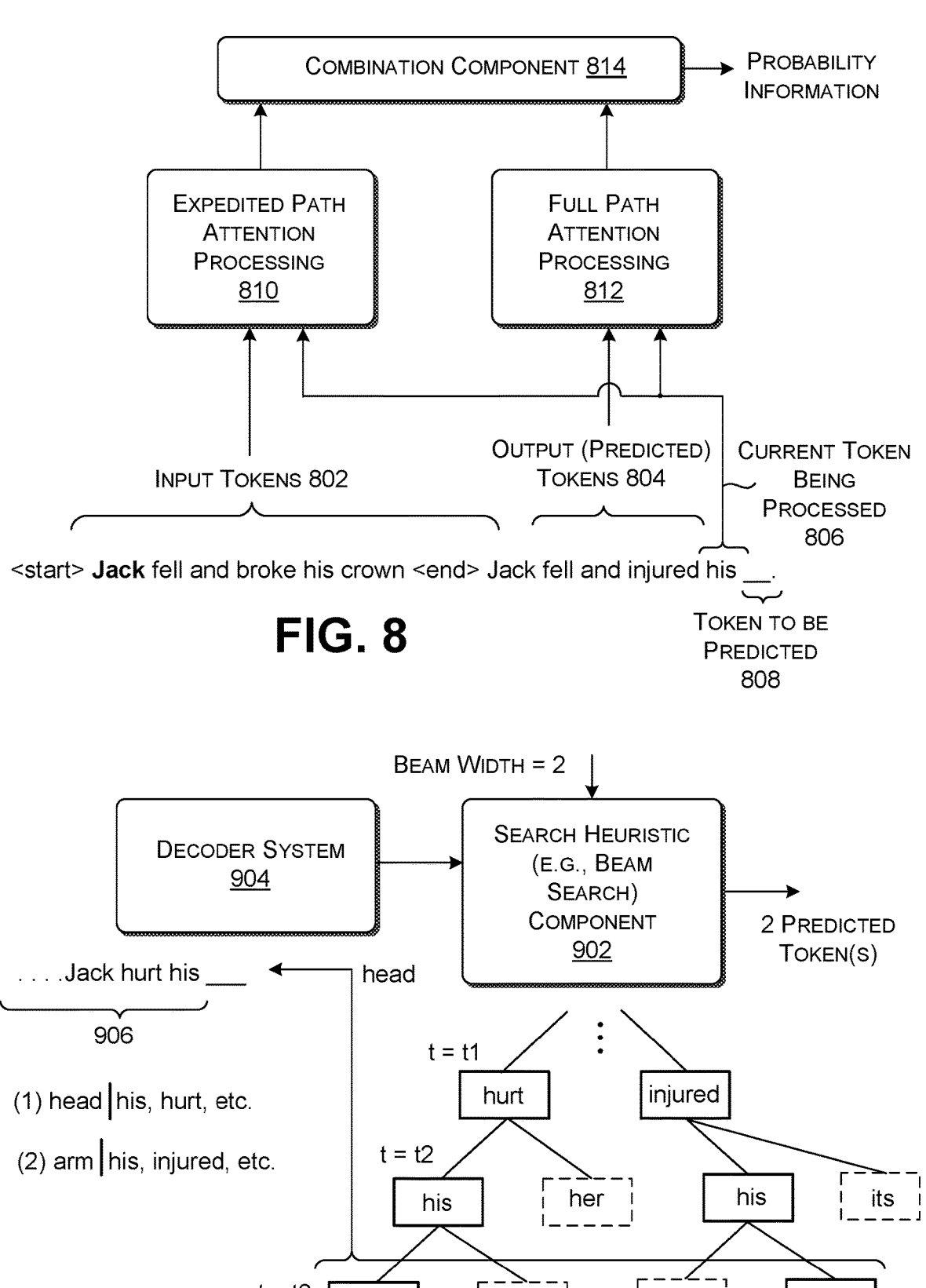
FIG. 8 shows further illustrative details of one manner of operation of the standalone decoder system of FIG. 7.
FIG. 9 shows an example of a search heuristic component for use in conjunction with the encoder-decoder system of FIG. 4 or the standalone decoder system of FIG. 7.

FIG. 1 shows an attention mechanism 102 having an expedited processing path 104 that makes efficient use of memory and processing resources. The advantages of the expedited processing path 104 can best be conveyed by an introductory explanation of a full processing path 106. In some implementations, the attention mechanism 102 omits the full processing path 106, and it is only illustrated in FIG. 1 to highlight the advantages of the expedited processing path 104. In other implementations, the attention mechanism 102 can include a combination of the expedited processing path 104 and the full processing path 106. FIG. 8, to be explained below, shows one such example of an attention mechanism that combines the expedited and full processing paths (104, 106).

The full processing path 106 produces attention information by first generating instances of head-specific query information $(Q_1, Q_2, \ldots, Q_h)$ 108, instances of head-specific key information $(K_1, K_2, K_h)$ 110, and instances of head-specific value information $(V_1, V_2, \ldots, V_h)$ 112. The symbol h refers to a number of "heads" used by the attention mechanism 102. In some non-limiting implementations, h=16. A head, in turn, is associated with a representational space in which a piece of information can be mapped. The heads are associated with different respective representational spaces. The attention mechanism 102 benefits from the use of different heads by capturing different aspects of the information fed to it. The heads can produce different insights; for example, two different heads can reach different conclusions as to which word in a sentence is most important to a particular word under consideration. The full processing path 106 then stores at least the instances of head-specific key information 110 and the instances of head-specific value information 112 in cache memory (not shown in FIG. 1).

A query expansion component 114 produces each instance of head-specific query information $Q_1$ 108 by linearly projecting original query information using a first machine-trained weighting matrix $$W_i^Q.$$

Another expansion component 116 produces each instance of head-specific key information $K_i$ 110 by linearly projecting original key information using a second machine-trained weighting matrix $$W_i^K.$$

The other expansion component 116 produces each instance of the head-specific value information $V_i$ 112 by linearly projecting original value information using a third machine-trained matrix $$W_i^V.$$

A full path (FP) attention probability generation component 118 can then generate a plurality of instances of probability information $(p_1, p_2, \ldots, p_h)$ 120, for model dimension d, using the following equation:

$$p_i = \text{softmax}\left(\frac{Q_i K_i^T}{\sqrt{d}}\right). \tag{1}$$

Equation (1) generates a dot product of the head-specific query information $Q_i$ and the transpose of the head-specific key information $K_i$. This effectively identifies the relevance of at least one individual token associated with the original query with each of a plurality of tokens associated with the original key information. Equation (1) scales this product by a scaling factor $\sqrt{d}$, to produce a scaled result, and then generates the normalized exponential function (softmax) of the scaled result.

A full path (FP) result generation component 122 next produces attention information (AttnMultiHead) by generating the product of each instance of probability information $p_i$ by corresponding head-specific value information $V_i$ and a machine-trained weighting matrix $$W_i^O.$$

It then sums this head-specific product information across the heads. In other words:

$$AttnMultiHead = \sum_{i=1}^{h} p_i V_i W_i^O. \tag{2}$$

Advancing momentarily to FIG. 2, this figure shows an example 202 of the operation of the full processing path 106 of FIG. 1. Assume in this merely illustrative case that a standalone decoder system performs self-attention in the course of synthesizing text. That is, assume that the decoder system is fed an initial part of a sentence as input information. It then operates in an iterative manner to complete the sentence, token by token, in a plurality of respective time steps. Upon predicting an output token, the decoder system adds that token to the end of the sentence that is fed as input information into the decoder system.

More specifically, assume that, at a particular instance of time, the series of input tokens make up the incomplete phrase "<start> Jack when up a hill and fell down and broke his," where "<start> is a token that designates a start of a sequence. Assume that the last word 204 in this sequence, "his," serves as a query. The attention mechanism of the decoder system performs self-attention by determining the relevance of each other word in the input sentence to the word "his". In other words, the self-attention mechanism determines how much attention it should pay to each other word in the input sentence when interpreting the word "his". It may find, for instance, that the word "Jack" is most relevant to the task of interpreting the meaning of the word "his".

In still greater detail, the decoder system maps the words into a plurality of token embeddings 206 using a lookup table or a machine-trained model. (Note that the terms "word" and "token" are used interchangeably in some contexts, but, in other implementations, the decoder can operate on tokens that represent fragments of words, not necessarily whole words; a "token" generally refers to any unit of information processed by a decoder system. Any reference to "word" herein can be replaced with a more general reference to "token.") Each token embedding is a vector of a prescribed dimension (such as 1024) that expresses the meaning of a corresponding word within a semantic space. The decoder system also combines the token embeddings 206 with position information that respectively conveys the positions of the words in the input sequence.

The decoder system then uses linear projection 208 to map the token embeddings 206 into different instances of head-specific query information 210, different instances of head-specific key information 212, and different instances of head-specific value information 214. The decoder system performs each conversion using plural head-specific weighting matrices. For instance, the decoder system generates the plural instances of key information 214 using plural respective head-specific key matrices $$(W_1^K, W_2^K, \ldots, W_h^K).$$

In the context of FIG. 1, the query expansion component 114 and the other expansion component 116 perform the role of the linear projection 208.

Note that, in this specific example, the different instances of head-specific query information correspond to different respective vectors. That is, each vector of the head-specific query information corresponds to a head-specific representation of the last word "his" of dimension d. The different instances of head-specific key information and the different instances of head-specific value information correspond to different respective matrices. Each matrix packs together a plurality of vectors of dimension d associated with respective words in the input sentence that precede the word "his," together, in some implementations, with the vector associated with the word "his".

An attention mechanism 216 processes the above-identified head-specific information to generate attention information. As will be clarified below, the decoding system may include plural attention mechanisms at plural respective levels. Each subsequent decoding operation (not specifically shown) operates on output information generated by a preceding decoding operation. Further, each decoding operation may use different weighting matrices to produce different respective head-specific instances of query information, key information, and value information.

The result of the decoding operations is decoder output information 218. The decoder output information 218 predicts one or more candidate tokens that follow the last word 204 in the sentence, "his". Assume that the word "arm" has the highest probability. In other implementations, described below, the decoder system can retain and process n of the most likely output tokens, e.g., by retraining and processing "arm," "crown," and "head".

To provide a more concrete understanding of self-attention, consider the application of Equation (1) to gauge the relevance of the word "his" to the word "Jack". The head-specific query information represents the word "his," while a vector within the head-specific key information and a vector within the head-specific value information represent the word "Jack". The dot product of the head-specific query information with the head-specific key vector for "Jack" conveys the degree to which "his" is relevant to "Jack". Equation (1) converts this dot product into probability information using the softmax operation. Equation (2) then multiples the probability information by the head-specific value information for "Jack," which has the effect of weighting the meaning of the word "Jack" by the extent to which it is considered relevant to the word "his". Equation (2) then combines the insight captured by different heads, e.g., by forming a combination of the head-specific attention results, respectively weighted by the head-specific weighting matrix $$W_i^O.$$

The operation summarized above is data intensive and consumes a significant amount of resources. For instance, the decoder system is tasked with responsibility of caching the head-specific key information 212 and the head-specific value information 214. This consumes a significant amount of memory space. It also takes time to load this information into memory and retrieve it from memory, which negatively affects the latency of the decoder system. Further, the operation performed by the other expansion component 116 is computationally expensive. This is because it involves forming the product of two two-dimensional matrices to generate each instance of head-specific key information, and forming the product of two two-dimensional matrices to generate each instance of head-specific value information.

Returning to FIG. 1, the expedited processing path 104 provides a solution to the above-noted technical challenges. By way of overview, the query expansion component 114 still converts original query information into a plurality of instances of head-specific query information 124. But the expedited processing path 104 does not use the other expansion component 116 to also convert the original key information and the original value information into respective instances of head-specific key information and head-specific value information. Rather, the expedited processing path 104 operates directly on shared key-value (KV) information 126, which may also be referred to as hidden information (H). The shared KV information reflects whatever information is multiplied, in the full processing path 106, by the head-specific weighting matrices $$(W_i^K, W_i^V).$$

In the example of FIG. 2, for instance, the shared KV information 126 represents the word embeddings associated with the words preceding "his" in the sentence and the word embedding of the word "his," prior to linearly projecting these vectors into head-specific representational spaces. The expedited processing path 104 is more efficient than the full processing path 106 because it does not need to store head-specific key information and head-specific value information in memory. It also can forego the processing operation required to load this information in memory. The expedited processing path 104 also avoids the need to perform the computationally expensive operation of forming a product of the original key information with each head-specific weighting matrix, and a product of the original value information and each head-specific weighting matrix.

An expedited path (EP) attention probability generation component 128 maps the plurality of instances of head-specific query information 124 and the shared KV information 126 into a plurality of instances of probability information 130. An expedited path (EP) attention result generation component 132 then maps the plurality of instances of probability and the shared KV information 126 into attention information.

Overall, both the expedited processing path 104 and the full processing path 106 can be implemented by one or more neural networks (referred to in the singular below for brevity), as described further below. A training system 134 produces weighting values that govern the operation of the attention mechanism 102. For instance, the training system

134 produces all of the weighting matrices identified in the various equations presented herein. The training system 134 performs this task by iteratively processing a plurality of training examples in a data store 136 with the objective of maximizing or minimizing some loss function. With respect to a text generation task, the loss function can reward the prediction of correct output tokens and penalize the prediction of incorrect output tokens. The training system 134 can apply any training technique (e.g., any backpropagation-based training technique) to achieve this optimization, such as Stochastic Gradient Descent. The training examples in the data store 136 can provide examples of correctly predicted tokens and incorrectly predicted tokens, labeled as such.

Figure 3:
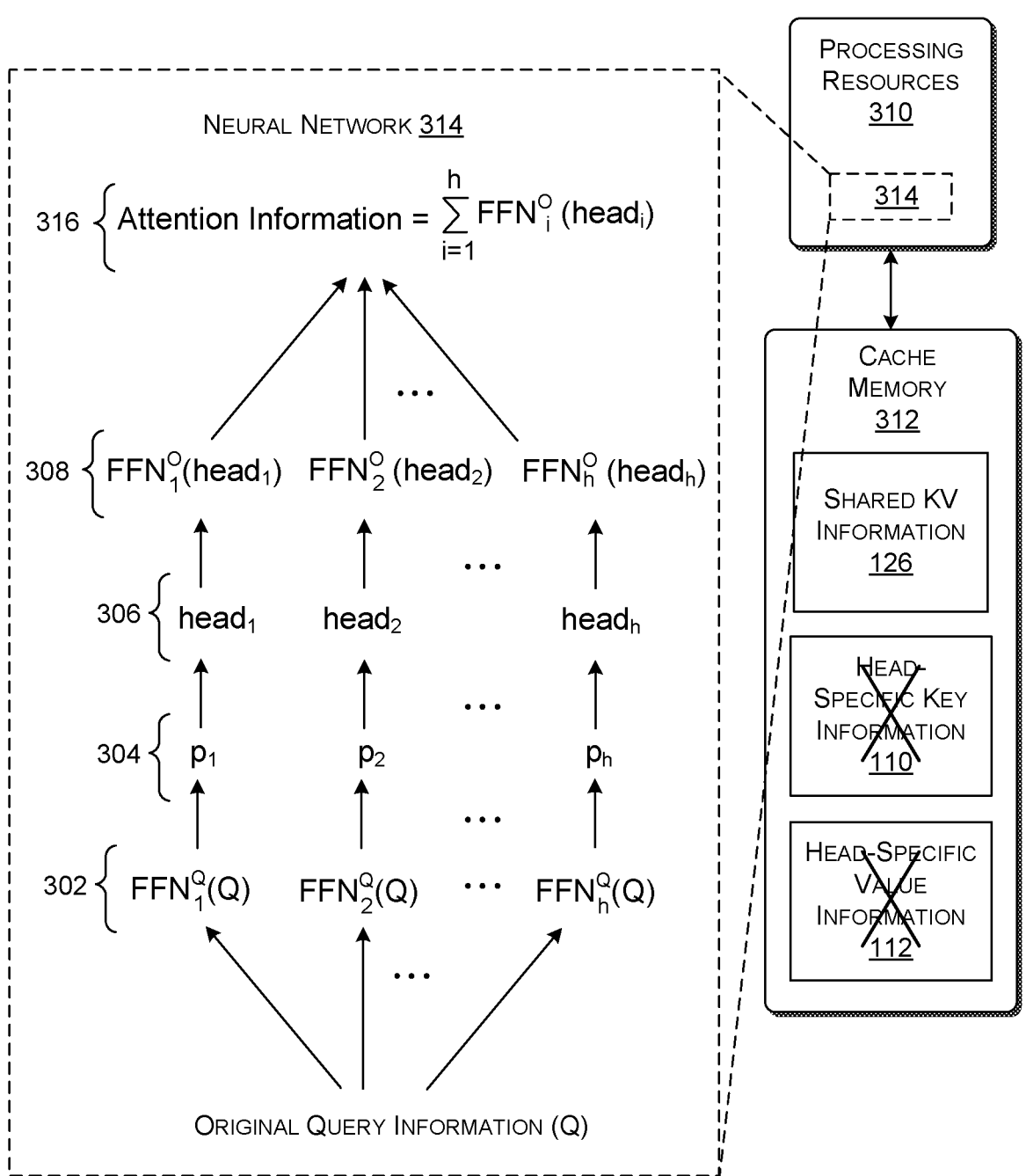
FIG. 3 shows illustrative operations performed by the attention mechanism of FIG. 1.

Advancing now to FIG. 3, this figure provides further details regarding operations that the attention mechanism 102 can perform in the expedited processing path 104. However, note that this detail is presented in the spirit of illustration, not limitation; other implementations can partition the operations of the attention mechanism 102 in different ways compared to the example of FIG. 3.

At stage 302, the expedited processing path 104 uses a feed-forward neural network (e.g., a fully connected neural network) having any number of layers to map the original query information Q into plural respective instances of $$FFN_i^Q(Q),$$

per the following equation:

$$FNN_i^Q(Q) = QW_i^Q(W_i^K)^T. \tag{3}$$

Recall that $$W_i^Q$$

is a machine-trained weighting matrix to be applied to query information, while $$W_i^K$$

is a machine-trained weighting matrix that is directly applied to key information in the full processing path 106 (but is here applied to the original query information). Note, however, that the expedited processing path 104 does not need to actually store head-specific query information produced by Equation (3) in cache memory.

At a stage 304, the expedited processing path 104 generates a plurality of instances of probability information $p_i$ using the following illustrative equation:

$$p_i = \text{softmax}\left(\frac{FNN_i^Q(Q)K^T}{\sqrt{d_k}}\right). \tag{4}$$

In Equation (4), K represents the same shared KV information 126, which, again, does not represent head-specific information. $d_k$ is a scaling factor. In some implementations, $d_k$ equals the $d_m$ (the dimension of the model) divided by h (the number of heads). In some implementations, the expedited processing path 104 can shape the size of the original query information Q such that it can be successfully multiplied by the shared key information 126, e.g., by adjusting the dimension(s) of the original query information Q to match a first dimension of the shared key information 126. Note that the product in the numerator of Equation (4) involves multiplying a one-dimensional matrix $$(\text{for } FNN_i^Q)$$

and a two dimensional matrix (for K), and is therefore less complex than the product, performed in the full processing path 106, of the original key information K by the head-specific key weighting matrix $$W_i^K$$

(which involves the multiplication of two two-dimensional matrices).

At stage 306, the expedited processing path 104 produces a plurality of instances of head-specific head information $head_i$, each of which is generated by forming the product of an instance of probability information $p_i$ and the shared KV information 126 (in this context, representing the original value information V). That is, $head_i = p_i V$.

In stages 308 and 316, the expedited processing path 104 generates attention information ($Attn_{mem-efficient}$) using the following equation:

$$Attn_{mem-efficient}(Q, K, V) = \sum_{i=1}^{h} FNN_i^O(head_i). \tag{5}$$

That is, in stage 308, the expedited processing path 104 applies a feed-forward neural network (e.g., a fully connected neural network) having any number of layers to generate a plurality of instances of $$FNN_i^O(head_i),$$

in which each such instance equals $$head_i W_i^V W_i^O.$$

Recall that $$W_i^V$$

is a machine-trained weighting matrix for application to value information V, while $$W_i^0$$

is a machine-trained matrix for linearly projecting the results of $$\text{head}_i\, W_i^V$$

into a desired space. In stage 316, the expedited processing path 104 sums together the plurality of instances of $$FNN_i^O(\text{head}_i)$$

computed in stage 308.

Relating the explanation of FIG. 3 to that of FIG. 1, the query expansion component 114 and the EP attention probability component 128 perform the operations of stages 302 and 304. The EP attention result generation component 132 performs the operations of stages 306, 308, and 316.

It can be shown that Equations (3)-(5) can be derived from the Equations (1) and (2) used in the full processing path 106. But the Equations (3)-(5) partition the operations of Equations (1) and (2) in a different manner than the full processing path 106. By doing so, the expedited processing path 104 can eliminate the need to compute and store head-specific key information and head-specific value information in memory. Because of the above property, in some implementations, the expedited processing path 104 will produce the same results as the full processing path 106. This makes the expedited processing path 104 lossless when compared to the full processing path 106. But this property does not need to be preserved in all implementations. For example, in other implementations, the Equations (3)-(5) are not mathematically derivable from Equations (1) and (2), and the expedited processing path 104 does not necessarily produce the same results as the full processing path 106. This makes the expedited processing path 104 lossy with respect to the full processing path 106. This difference does not necessarily make it less accurate or useful than the full processing path 106; this difference may merely reflect that the expedited processing path 104 expresses attention in a different manner than the full processing path 106, to satisfy any environment-specific objective(s).

FIG. 3 also summarizes the features of the expedited processing path 104 that make it resource efficient. More specifically, a computing system implements the attention mechanism 102 using processing resources 310 and cache memory 312. The processing resources 310 (e.g., GPUs, etc.) store the shared KV information in cache memory 312, but do not also store the head-specific key information 110 and the head-specific value information 112. This characteristic saves memory and also reduces the burden on the processing resources 310, which must otherwise load and manipulate this information. The expedited processing path 104 can also avoid the computation-intensive operations performed by the other expansion component 116 in the full processing path 106, which, as said, involve forming the product of two two-dimensional matrices.

Further note that, as described below, a decoder system includes plural layers of decoder-based processing, each of which may include one or more attention mechanisms. Each attention mechanism places demands on the processing and memory resources of the computing system which implements the decoder system. Hence, the processing and memory savings described above will increase relative to the number of attention mechanisms in a decoder system that make use of the expedited processing path 104.

Viewing the process of FIG. 3 as a whole, the processing operations summarized in FIG. 3 can be implemented by a neural network 314 having any number of subnetworks. Each subnetwork can include any number of layers. Any layer can use any activation function (such as an ReLU activation function) or no activation function. Some layers may operate based on machine-trained weighting values produced by the training system 134. Other layers may perform data manipulations that do not rely on machine-trained weighting values (e.g., by generating a dot product), etc.

The use of the expedited processing path 104 also has less direct benefits. For example, because the expedited processing path 104 reduces the amount of resources (e.g., processing and memory resources) required to run the machine-trained model produced by the training system 134, a resource-limited computing system is able to successfully run the machine-trained model. For instance, a handheld computing device (such as a smartphone) may have sufficient processing and memory resources to run the model. Alternatively, or in addition, the efficiency of the expedited processing path 104 allows the hosting computing system to use a more complex and robust machine-trained model than heretofore possible. Alternatively, or in addition, the attention mechanism's efficient use of processing and memory resources allows other competing applications to consume more of the hosting computing system's resources. Still other technical benefits are possible.

FIG. 4 shows an encoder-decoder system 402 that can incorporate the attention mechanism 102 of FIG. 1. The encoder-decoder system 402 includes an encoder 404 that that maps encoder input information into encoder output information, and a decoder 406 that maps decoder input information into decoder output information. More specifically, in some implementations, the decoder 406 incorporates one or more instances of the attention mechanism 102, but the encoder 404 does not use the attention mechanism 102. In this context, the encoder output information produced by the encoder 404 serves as the shared KV information 126 that is fed to the decoder 406. As in the previous examples, the encoder-decoder system 402 caches the shared KV information 126, but does not compute and store the head-specific key information and the head-specific value information. The head-specific query information processed by the decoder 406 derives from output tokens that are generated by the encoder-decoder system 402, which, in iterative token-by-token fashion, are fed back into the decoder 406 as input tokens.

An example will render the above explanation more concrete. Assume that the encoder-decoder system 402 is trained to perform translation from French to English. The encoder 404 processes a French sentence using various layers of self-attention (to be described below) to produce KV information. The decoder 406 generates the English translation of the French sentence in token-by-token fashion. At each stage, the decoder input information fed to the decoder 406 includes the English words predicted up to this point in time. The decoder 406 uses the shared KV information 126 provided by the encoder 404 to supply values for K and V in Equations (3)-(5).

Internally, the encoder 404 can include any number of encoder blocks (408, 410, . . . , 412), each of which may include one or more attention mechanisms, e.g., attention mechanism (414, 416, . . . , 418). The decoder 406 likewise includes any number of decoder blocks (420, 422, . . . , 424), each of which may include one or more attention mechanisms, e.g., attention mechanisms (426, 428, 430). Each encoder or decoder block, other than the first block in a pipeline, receives input information from a preceding block. For example, the second encoder block 410 performs self-attention on the encoder output information produced by the first encoder block 408.

An output probability generation component 432 can use a combination of a linear transformation operation and the softmax function to map the decoder output information into a probability distribution. The probability distribution identifies the probability associated with each word in an identified vocabulary. A search heuristic component (described later) can use any search heuristic to select from among the candidate tokens. In a greedy search heuristic, the search heuristic component selects the token having the highest probability at each time step.

Figures 5, 6:
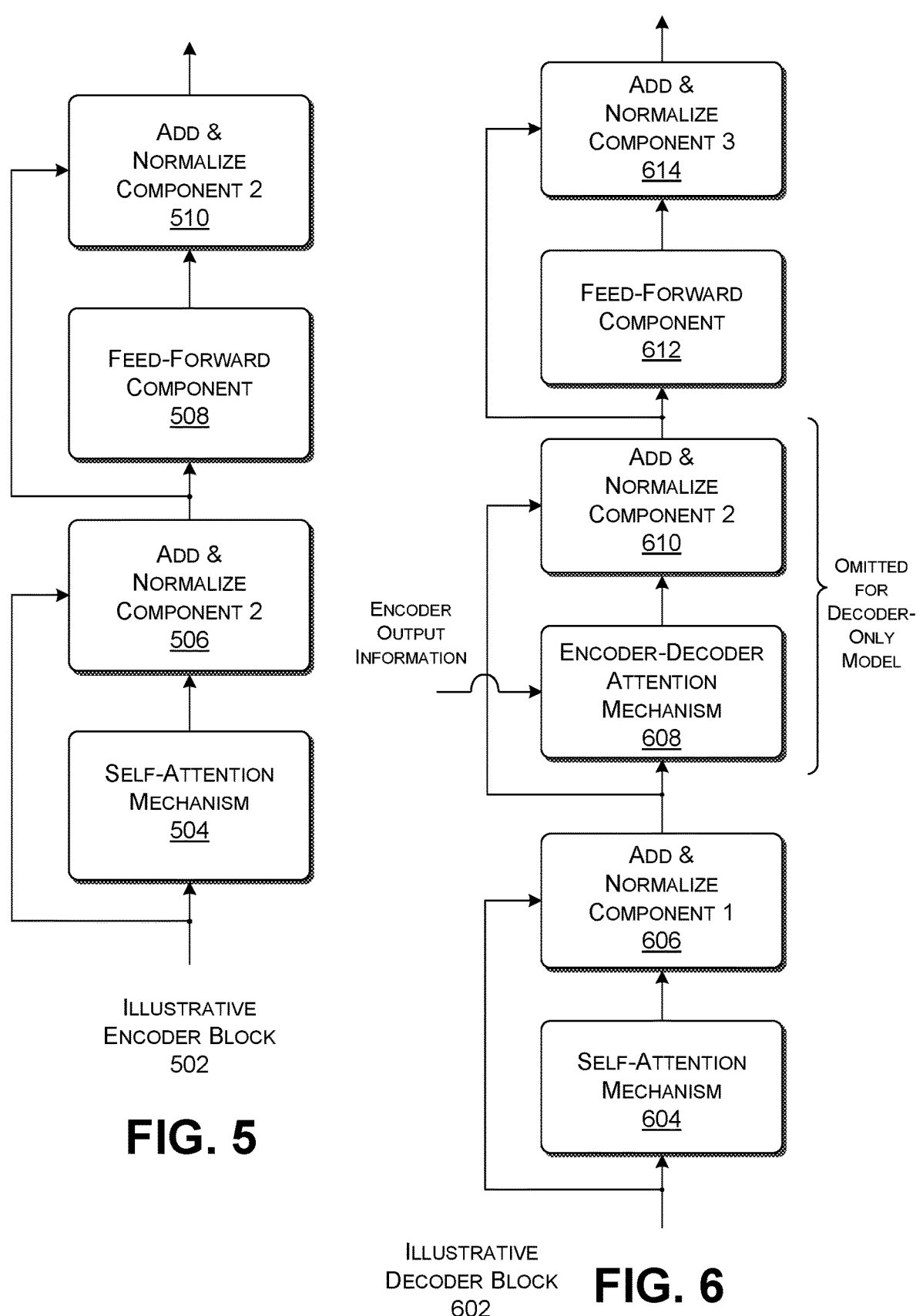
FIG. 5 shows one implementation of an encoder block in the encoder-decoder system of FIG. 4.
FIG. 6 shows one implementation of a decoder block in the encoder-decoder system of FIG. 4.

FIG. 5 shows an illustrative and non-limiting encoder block 502. It includes a self-attention mechanism 504, an add-&-normalize component 506, a feed-forward component 508, and another add-&-normalize component 510. The self-attention mechanism performs self-attention, e.g., by mapping input information into head-specific query, key, and value information using Equations (1) and (2). The first add-&-normalize component 506 adds the input information fed to the self-attention mechanism 504 to the output information provided by the self-attention mechanism 504 (thus forming a residual connection), and then performs layer-normalization on that result. Layer normalization entails adjusting values in a layer based on the mean and deviation of those values in the layer. The feed-forward component 508 uses one or more fully connected neural network layers to map input information to output information. The second add-&-normalize component 510 performs the same function as the first add-&-normalize component 506.

FIG. 6 shows an illustrative and non-limiting example of a decoder block 602. The decoder block 602 includes a self-attention mechanism 604, an add-&-normalize component 606, encoder-decoder attention mechanism 608, another add-&-normalize component 610, a feed-forward component 612, and another add-&-normalize component 614. The self-attention mechanism 604 performs masked self-attention on decoder input information fed to it. The decoder input information, in turn, includes one or more output tokens produced by the decoder 406 (after these tokens have been converted to embeddings in the manner previously described). The self-attention mechanism 604 performs masking so that positions in a sequence after a last-predicted token (which are unknown at this time) do not bias its results.

On the other hand, the encoder-decoder attention mechanism 608 uses the shared KV information 126 as original key and value information. It uses the output information supplied by the preceding component (the add-&-normalize component 606) as the original query information. The add-&-normalize components (606, 610, 614) and the feed-forward component 612 perform the same functions described above for the encoder block 502.

In some implementations, the encoder-decoder attention mechanism 608 uses the expedited processing path 104, while the self-attention mechanism 604 uses the full processing path 106. The self-attention mechanism 504 in the encoder block 502 can also use the full processing path 106. But other implementations can apply the expedited processing path 104 in different ways, e.g., by extending its use to other components shown in FIGS. 5 and 6.

Figure 7:
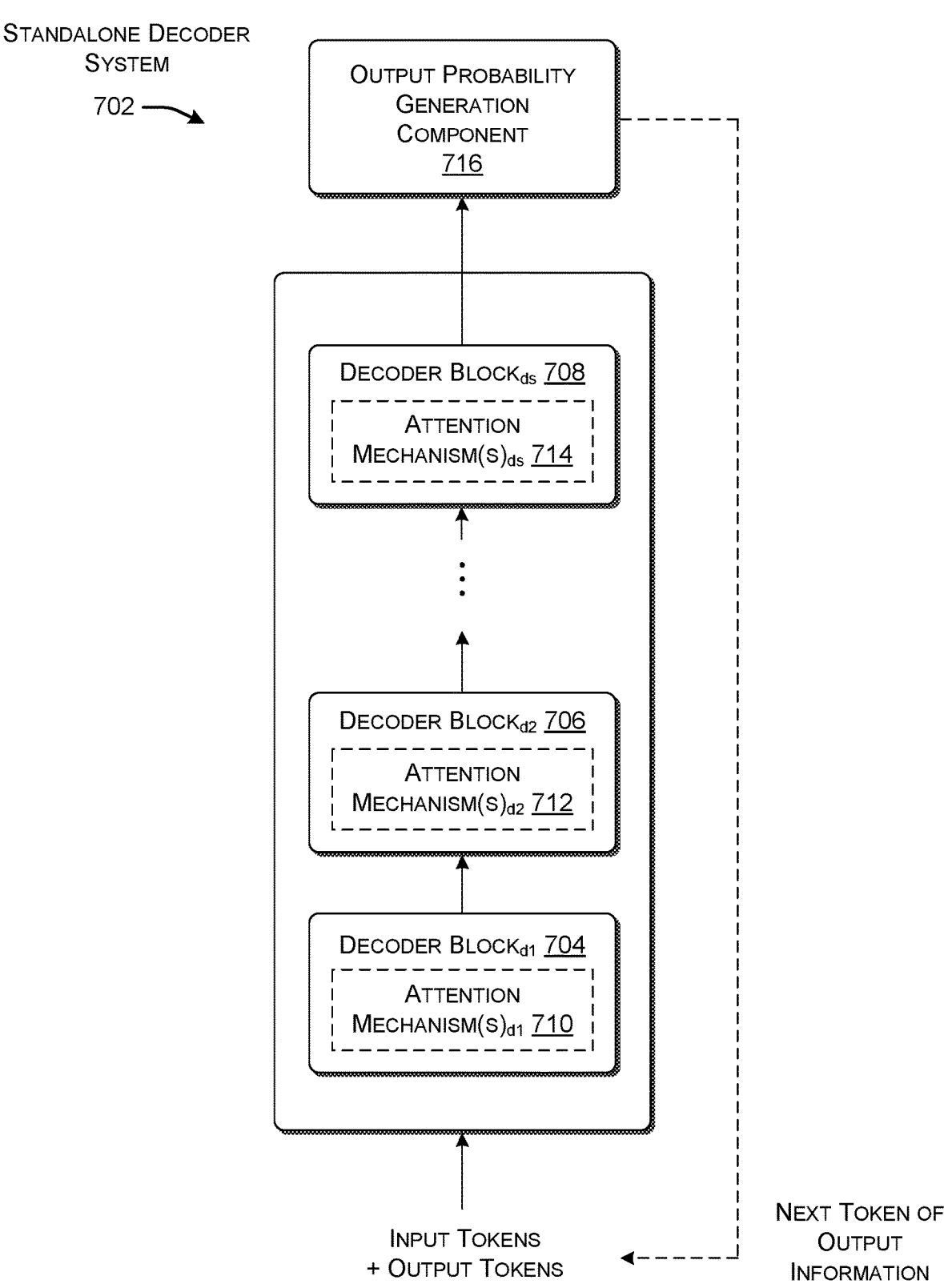
FIG. 7 shows one implementation of a standalone decoder system that can incorporate the attention mechanism of FIG. 1.

FIG. 7 shows an example of a standalone decoder system 702, also referred to as a decoder-only system. The standalone decoder system 702 is so named because, unlike the encoder-decoder system 402 of FIG. 4, it does not use an encoder. In some non-limiting implementations, the standalone decoder system 702 receives decoder input information that includes the concatenation of one or more input tokens (which are supplied as given input) and one or more output tokens. Consider the case in which the standalone decoder system 702 is assigned the task of converting an input text passage into a reformulation (e.g., a summary) of the input text passage. In this case, the decoder input information may include a concatenation of the input text passage with the formulated passage, as the reformulated passage exists at a current point in time (because, as said, it is calculated on a token-by-token basis).

The standalone decoder system 702 includes a plurality of decoder blocks (704, 706, . . . , 708), each of which may include one or more attention mechanisms, e.g., attention mechanisms (710, 712, . . . , 714). An output probability generation component 716 performs the same function as the same-named component of FIG. 4. In some implementations, each decoder block in the standalone decoder system 702 has the same construction as the decoder block 602 shown in FIG. 6, but with the encoder-decoder attention mechanism 608 and the add-&-normalize component 610 omitted. That is, the encoder-decoder attention mechanism 608 is omitted because the standalone decoder system 702 receives no input from an encoder.

In some implementations, the attention mechanisms of each decoder block can use the expedited processing path 104. With respect to the attention mechanism 710 of the first decoder block 704, the current token under consideration is used to produce the head-specific query information. The current token and the other tokens fed to the attention mechanism 710 are used to produce the shared KV information 126. The attention mechanism 710 itself performs self-attention in a manner similar to that explained above with respect to FIG. 2, except that, here, the standalone decoder system 702 does not compute and store instances of head-specific key information or instances of head-specific value information. The attention mechanisms (712, . . . , 714) of later decoder blocks (706, . . . , 708) perform the same operation as the first attention mechanism 710, but receive input information from the preceding block. That is, for instance, the first decoder block 704 produces decoder output information that represents the current token under consideration. That decoder output information serves as query information for input to the second decoder block 712. The key information and the value information are made up of a set of instances of decoder output information generated by the first decoder block 704 up to the current point in time. That is, the input to the second decoder block 712 parallels that of the first decoder block 704; but the input to the second decoder block 712 is assembled from the current and prior output information generated by the first decoder block 704. More specifically, in some implementations, each decoder block stores the output of its preceding decoder block (if any) in cache memory 312, which, in the expedited processing path 104, the decoder block treats as shared KV information. In contrast, in the full processing path 106, the standalone decoder system 702 would store head-specific versions of key information and head-specific versions of value information for each decoder block. Thus, for the standalone decoder system 102, the use of the expedited processing path 104 can reduce cache storage requirements by at least half compared to the full processing path 106.

FIG. 8 shows further details of one way to implement self-attention in the standalone decoder system 702. Assume here that the input passage fed to the standalone decoder system 702 is the sentence "Jack fell and broke his crown". The input passage includes given input tokens 802. Further assume that, at this particular point in time, the standalone decoder system 702, has produced the following output tokens 804 of a summary: "Jack fell and injured his". The word "his" 806 corresponds to the current token being processed. The goal of the standalone decoder system 702 is to correctly predict a next token 808 of the summary.

In some non-limiting applications, the standalone decoder system 702 can use the expedited path attention processing 810 to operate on the given input tokens 802. The standalone decoder system 702 can use the full path attention processing component 812 to process the predicted output tokens 804. A combination component 814 combines probability information generated by the expedited path attention processing 810 and probability information generated by the full path attention processing component 812, e.g., by concatenating this probability information. The standalone decoder system 702 can then continue with the processing operations summarized in FIG. 3, e.g., by taking the softmax of the concatenated probability information.

FIG. 9 shows a search heuristic component 902 that chooses one or more tokens based on output from a decoder system 904. In some implementations, the search heuristic component 902 applies a greedy heuristic by choosing the candidate token having the highest probability at each time instance. In other implementations, the search heuristic component 902 uses the beam search heuristic to select, at any given instance of time, the n best candidate tokens, where the value of n defines a beam width. The search heuristic component 902 determines the likelihood of each candidate token as a conditional probability, taking into account both the probability score of a candidate token under consideration and the probability scores of the words in a search path that leads to the candidate token under consideration.

For example, at time t=t3, the previous tokens that have been generated include "Jack hurt his". With respect to one still-active branch of the search space, the search heuristic component 902 identifies "head" and "arm" as viable candidate tokens. With respect to another still-active branch of the search space, the search heuristic component 902 identifies "feet" and "arm" as two other viable candidate tokens. For the case of n=2, the search heuristic component 902 selects the two tokens having the highest conditional probability, here corresponding to "head" and "arm". For example, the conditional probability of "head" depends on the words in the path through the search tree that terminates in "head".

In response to the output of the search heuristic component 902, the decoder system 904 can process plural candidate output tokens in each prediction step. For example, the decoder system 904 can produce a set of viable next tokens for the case in which "head" is chosen, and a set of viable next tokens for the case in which "arm" is chosen. The decoder system 904 can leverage the expedited processing path to use the same shared KV information when processing both "head" and "arm". This characteristic enables the decoder system 904 and the search heuristic component 902 to consume less processing and memory resources compared to the full processing path 106.

Figure 10:
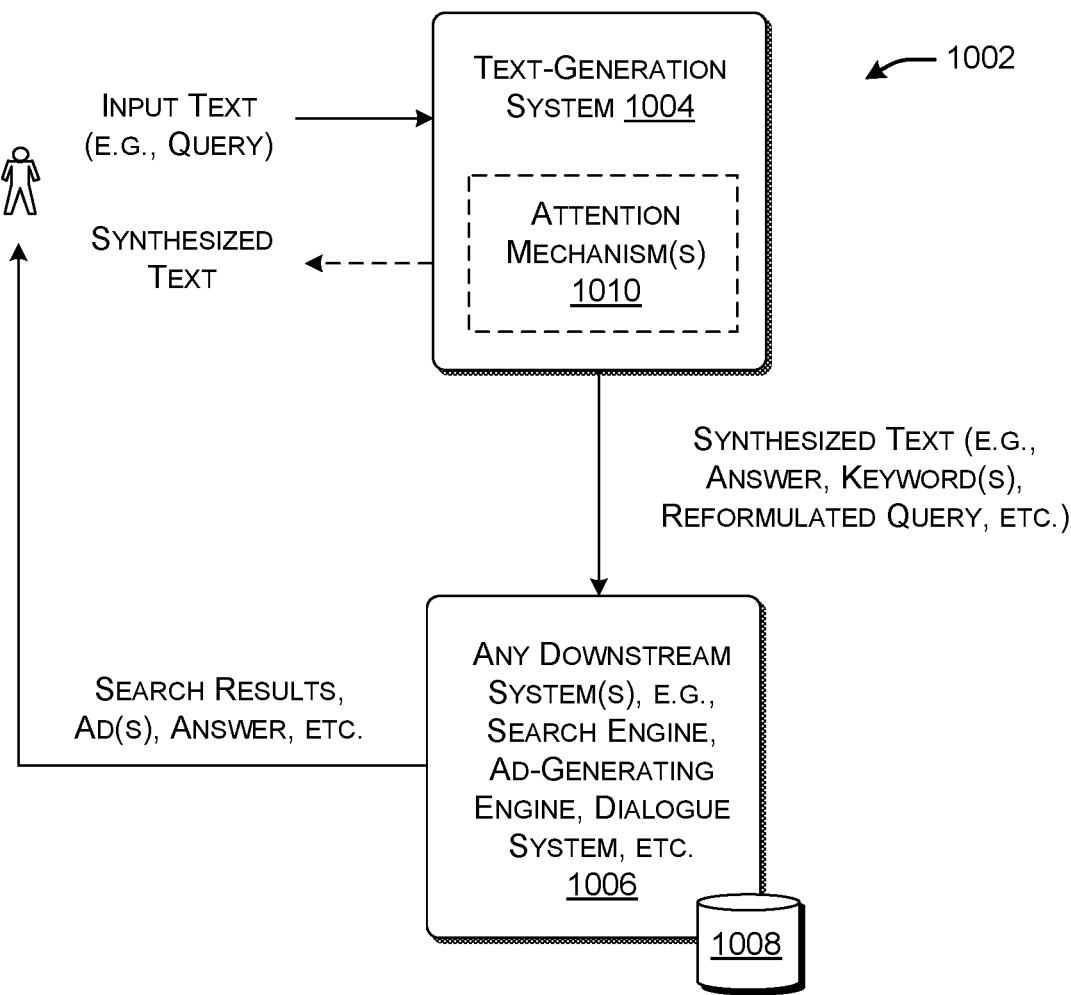
FIG. 10 shows an illustrative system that applies the attention mechanism of FIG. 1. This system specifically leverages attention information generated by the attention mechanism to produce synthesized text based on input text.

FIG. 10 shows an example of an application system 1002 for applying one or more attention mechanisms of the type described above. More specifically, FIG. 10 shows a text-generation system 1004 that obtains input text from one or more sources. In response to the input text, in whatever manner obtained, the text-generation system 1004 produces synthesized text. The synthesized text derives from, or is otherwise based on, the input text. In some implementations, the text-generation system 1004 sends the synthesized text to the user.

In other implementations, the text-generation system 1004 forwards the synthesized text to any downstream system(s) 1006. The downstream system(s) 1006 then take any type of action based on the synthesized text. For instance, the downstream system(s) 1006 can identify an information item that matches the synthesized text, and then send the information item to the user.

To be more concrete, the application system 1002 can leverage the text-generation system 1004 in the following illustrative and non-limiting scenarios. In a first scenario, the user is an end user who explicitly requests the text-generation system 1004 to generate a summary of input text in an identified input passage. The text-generation system 1004 responds by generating synthesized text that represents a reformulation of the input text, and sends the synthesized text to the user.

In a second scenario, the user visits a web page or views a document. The application system 1002 automatically forwards input text contained in that web page or document to the text-generation system 1004. The text-generation system 1004 responds by generating synthesized text based on the web page or document, e.g., by summarizing the web page or document. The downstream system(s) 1006 can leverage the synthesized text for various purposes, such as by sending a user an advertisement or other type of information item based on triggering keyword information in the synthesized text.

In a third scenario, the user is an advertiser who wishes to generate an ad for a website or a portion thereof (including one or more web pages). The user begins by identifying the website or the portion thereof to the text-generation system 1004. The text-generation system 1004 responds by mapping text in the website (or portion thereof) to synthesized text. For example, the text-generation system 1004 can generate one or more keywords for the website. Or the text-generation system 1004 can generate information (such as a title) that summarizes the website for use in a digital ad. The text-generation system 1004 can then forward the synthesized text to the user for his or her consideration. In addition, or alternatively, the text-generation system 1004 can forward the synthesized text to the downstream system (s) 1006, which implements an ad-serving service. In some cases, the ad-serving service can store the synthesized text in a data store 1008 as keyword information, and then serve ads to users based on the keyword information.

In a fourth scenario, the text-generation system 1004 operates as a translation service. Here, the input text may correspond to a passage in a first language. The text-generation system 1004 produces a translation of the input text into a second language, and then sends the translated text to the user.

In a fifth scenario, the text-generation system 1004 is part of a dialogue service. Here, the input text may correspond to a question submitted by a user. The text-generation system 1004 responds to the question by mapping it to an appropriate response, and sending the response to the user.

Still other kinds of application systems are possible. The above-described application systems are described above in the spirit of illustration, not limitation.

The text-generation system 1004 can produce the synthesized text using any type of decoder system described above, including a decoder that is part of a decoder-encoder system (as shown in FIG. 4), or a decoder that operates as a standalone decoder system (as shown in FIG. 7). In either case, the decoder uses at least one attention mechanism 1010 that operates using the expedited processing path 104 of FIG. 1. Use of this processing path 104 allows the application system 1002 to consume processing and memory resources in an efficient manner for all of the reasons specified above.

B. Illustrative Processes

FIGS. 11 and 12 show processes that explain the operation of the attention mechanism 102 and hosting systems of Section A in flowchart form. Since the principles underlying the operation of the attention mechanism 102 and systems have already been described in Section A, certain operations will be addressed in summary fashion in this section. Each flowchart is expressed as a series of operations performed in a particular order. But the order of these operations is merely representative, and can be varied in other implementations. Further, any two or more operations described below can be performed in a parallel manner. In some implementations, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

More specifically, FIG. 11 shows a process 1102 that represents an overview of the operation of the expedited processing path 104 of the attention mechanism 102 of FIG. 1. In block 1104, the attention mechanism 102 obtains original query information. In block 1106, the attention mechanism 102 obtains shared key and value (KV) information. In one merely illustrative example, for instance, the attention mechanism 102 receives query information that is derived from a last-predicted token fed to the decoder 406 of the encoder-decoder system 402, and the attention mechanism 102 receives the shared KV information from the encoder 404 of the encoder-decoder system 402.

In block 1108, the attention mechanism 102 generates a plurality of instances of head-specific query information based on the original query information, the plurality of instances of head-specific query information being associated with a plurality of respective representational subspaces. In block 1110, the attention mechanism 102 generates a plurality of instances of probability information based on a product of the plurality of respective instances of head-specific query information and the shared KV information. In block 1112, the attention mechanism 102 generates the attention information based on the plurality of instances of probability information and the shared KV information, the attention information expressing an amount of attention to be paid to different parts of the shared KV information in interpreting the original query information. The operation of generating the plurality of instances of probability information and the operation of generating the attention information are performed using a neural network (e.g., the neural network 314 of FIG. 3), and are performed without caching a plurality of instances of head-specific key information and a plurality of instances of head-specific value information in memory 312, and without generating the plurality of instances of the head-specific key information and the plurality of instances of head-specific value information.

FIG. 12 is a process 1202 that summarizes the operation of the application system 1002 of FIG. 10, which makes use of the attention mechanism 102 of FIG. 1. In block 1204, the application system 1002 obtains input text, e.g., as submitted by a user in the form of a query and/or as received from any other source(s). In block 1206, the application system 1002 generates synthesized text by decoding the input text. The operation of generating synthesized text involves, in the expedited processing path 104, at least one attention operation of the type summarized in FIG. 11. In block 1208, application system 1002 performs any type of action based on the synthesized text. Illustrative actions may include: sending the synthesized text to a user; selecting an information item based on the synthesized text, etc.

C. Representative Computing Functionality

FIG. 13 shows an example of computing equipment that can be used to implement any of the systems summarized above. The computing equipment includes a set of user computing devices 1302 coupled to a set of servers 1304 via a computer network 1306. Each user computing device can correspond to any device that performs a computing function, including a desktop computing device, a laptop computing device, a handheld computing device of any type (e.g., a smartphone, a tablet-type computing device, etc.), a mixed reality device, a wearable computing device, an Internet-of-Things (IoT) device, a gaming system, and so on. The computer network 1306 can be implemented as a local area network, a wide area network (e.g., the Internet), one or more point-to-point links, or any combination thereof.

FIG. 13 also indicates that any hosting system 1308 that uses the attention mechanism 102 can be spread across the user computing devices 1302 and/or the servers 1304 in any manner. For instance, in some cases, the text-generation system 1004 and/or other system(s) 1006 of FIG. 10 are entirely implemented by one or more of the servers 1304. Each user may interact with the servers 1304 via a browser application or other programmatic interface provided by a user computing device. In other cases, the services provided by the systems (1004, 1006) are entirely implemented by a user computing device in local fashion, in which case no interaction with the servers 1304 is necessary. In other cases, the functionality associated with the systems (1004, 1006) is distributed between the servers 1304 and each user computing device in any manner. Similarly, the functionality of the training system 134 can be spread among the servers 1304 and any user computing device in any manner.

Figure 14:
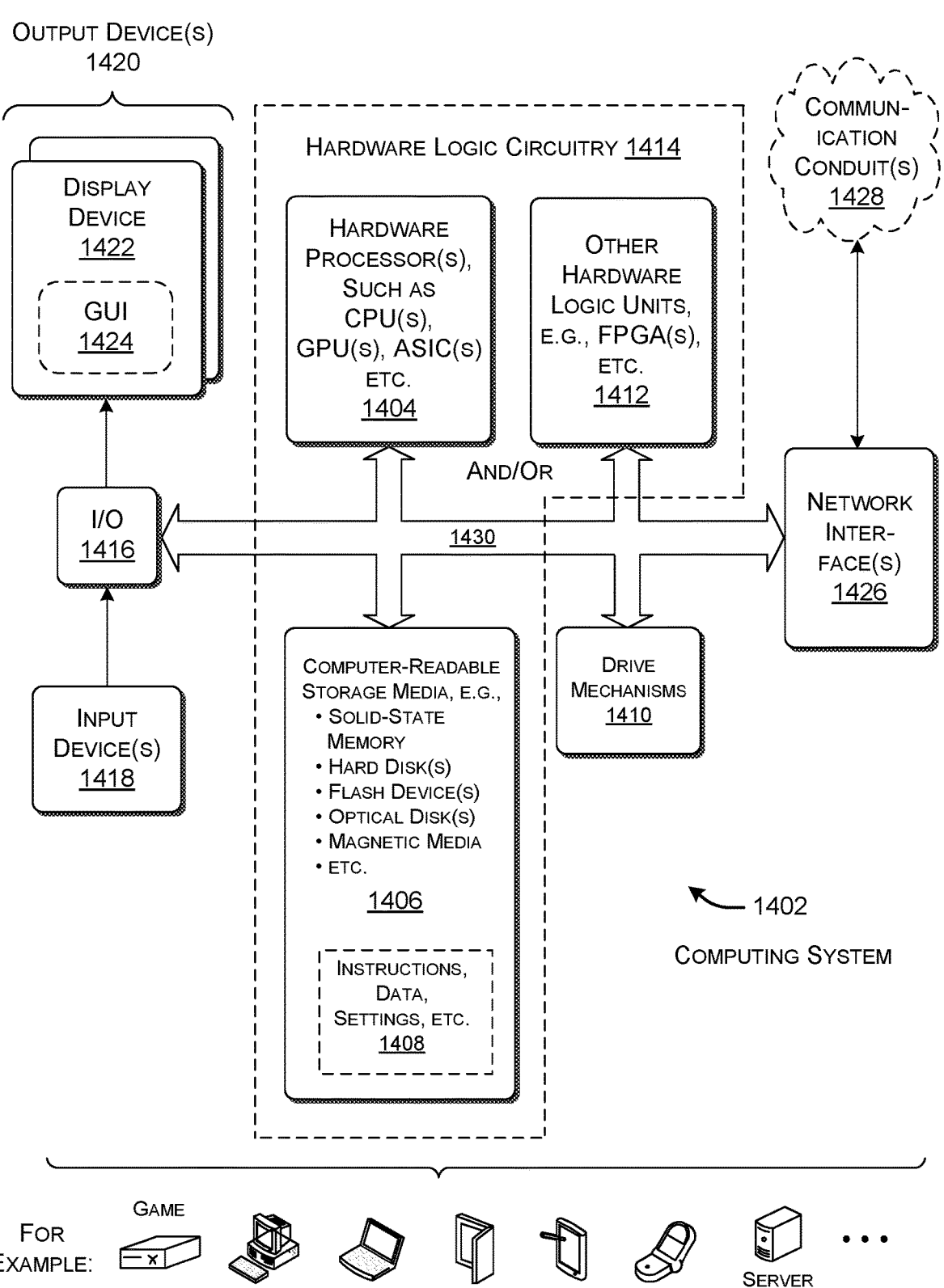
FIG. 14 shows an illustrative type of computing system that can be used to implement any aspect of the features shown in the foregoing drawings.

FIG. 14 shows a computing system 1402 that can be used to implement any aspect of the mechanisms set forth in the above-described figures. For instance, the type of computing system 1402 shown in FIG. 14 can be used to implement any server or any user computing device shown in FIG. 13. In all cases, the computing system 1402 represents a physical and tangible processing mechanism.

The computing system 1402 can include one or more hardware processors 1404. The hardware processor(s) 1404 can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing system 1402 can also include computer-readable storage media 1406, corresponding to one or more computer-readable media hardware units. The computer-readable storage media 1406 retains any kind of information 1408, such as machine-readable instructions, settings, data, etc. Without limitation, the computer-readable storage media 1406 may include one or more solid-state devices, one or more magnetic hard disks, one or more optical disks, magnetic tape, and so on. Any instance of the computer-readable storage media 1406 can use any technology for storing and retrieving information. Further, any instance of the computer-readable storage media 1406 may represent a fixed or removable unit of the computing system 1402. Further, any instance of the computer-readable storage media 1406 may provide volatile or non-volatile retention of information.

More generally, any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se in transit, while including all other forms of computer-readable media.

The computing system 1402 can utilize any instance of the computer-readable storage media 1406 in different ways. For example, any instance of the computer-readable storage media 1406 may represent a hardware memory unit (such as Random Access Memory (RAM)) for storing transient information during execution of a program by the computing system 1402, and/or a hardware storage unit (such as a hard disk) for retaining/archiving information on a more permanent basis. In the latter case, the computing system 1402 also includes one or more drive mechanisms 1410 (such as a hard drive mechanism) for storing and retrieving information from an instance of the computer-readable storage media 1406.

The computing system 1402 may perform any of the functions described above when the hardware processor(s) 1404 carry out computer-readable instructions stored in any instance of the computer-readable storage media 1406. For instance, the computing system 1402 may carry out computer-readable instructions to perform each block of the processes described in Section B.

Alternatively, or in addition, the computing system 1402 may rely on one or more other hardware logic units 1412 to perform operations using a task-specific collection of logic gates. For instance, the hardware logic unit(s) 1412 may include a fixed configuration of hardware logic gates, e.g., that are created and set at the time of manufacture, and thereafter unalterable. Alternatively, or in addition, the other hardware logic unit(s) 1412 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 14 generally indicates that hardware logic circuitry 1414 includes any combination of the hardware processor(s) 1404, the computer-readable storage media 1406, and/or the other hardware logic unit(s) 1412. That is, the computing system 1402 can employ any combination of the hardware processor(s) 1404 that execute machine-readable instructions provided in the computer-readable storage media 1406, and/or one or more other hardware logic unit(s) 1412 that perform operations using a fixed and/or programmable collection of hardware logic gates. More generally stated, the hardware logic circuitry 1414 corresponds to one or more hardware logic units of any type(s) that perform operations based on logic stored in and/or otherwise embodied in the hardware logic unit(s). Further, in some contexts, each of the terms "component," "module," "engine," "system," and "tool" refers to a part of the hardware logic circuitry 1414 that performs a particular function or combination of functions.

In some cases (e.g., in the case in which the computing system 1402 represents a user computing device), the computing system 1402 also includes an input/output interface 1416 for receiving various inputs (via input devices 1418), and for providing various outputs (via output devices 1420). Illustrative input devices include a keyboard device, a mouse input device, a touchscreen input device, a digitizing pad, one or more static image cameras, one or more video cameras, one or more depth camera systems, one or more microphones, a voice recognition mechanism, any position-determining devices (e.g., GPS devices), any movement detection mechanisms (e.g., accelerometers, gyroscopes, etc.), and so on. One particular output mechanism may include a display device 1422 and an associated graphical user interface presentation (GUI) 1424. The display device 1422 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing system 1402 can also include one or more network interfaces 1426 for exchanging data with other devices via one or more communication conduits 1428. One or more communication buses 1430 communicatively couple the above-described units together.

The communication conduit(s) 1428 can be implemented in any manner, e.g., by a local area computer network, a wide area computer network (e.g., the Internet), point-to-point connections, etc., or any combination thereof. The communication conduit(s) 1428 can include any combination of hardwired links, wireless links, routers, gateway functionality, name servers, etc., governed by any protocol or combination of protocols.

FIG. 14 shows the computing system 1402 as being composed of a discrete collection of separate units. In some cases, the collection of units corresponds to discrete hardware units provided in a computing device chassis having any form factor. FIG. 14 shows illustrative form factors in its bottom portion. In other cases, the computing system 1402 can include a hardware logic unit that integrates the functions of two or more of the units shown in FIG. 1. For instance, the computing system 1402 can include a system on a chip (SoC or SOC), corresponding to an integrated circuit that combines the functions of two or more of the units shown in FIG. 14.

The following summary provides a non-exhaustive set of illustrative examples of the technology set forth herein.

(A1) According to a first aspect, some implementations of the technology described herein include a method (e.g., the process 1102 of FIG. 11), for generating attention information in a neural network. The method includes, as part of an expedited processing path, obtaining original query information (e.g., in block 1104), and obtaining shared key and value (KV) information (e.g., in block 1106). The method also includes generating (e.g., in block 1108) a plurality of instances of head-specific query information based on the original query information, the plurality of instances of head-specific query information being associated with a plurality of respective representational subspaces. The method further includes generating (e.g., in block 1110) a plurality of instances of probability information based on a product of the plurality of respective instances of head-specific query information and the shared KV information. The method further includes generating (e.g., in block 1112) the attention information based on the plurality of instances of probability information and the shared KV information, the attention information expressing an amount of attention to be paid to different parts of the shared KV information in interpreting the original query information. The operation of generating the plurality of instances of probability information and the operation of generating the attention information are performed using a neural network (e.g., the neural network 314 of FIG. 3), and are performed without caching a plurality of instances of head-specific key information and a plurality of instances of head-specific value information in memory (e.g., cache memory 312 of FIG. 3), and without generating the plurality of instances of the head-specific key information and the plurality of instances of head-specific value information. As previously noted, this last-mentioned feature of the method allows the method to make efficient use of processing and memory resources. It leads to other more indirect benefits, such as enabling the method to run on resource-limited computing platforms.

(A2) According some implementations of the method of A1, the method further includes obtaining input text, and using a text generation system to generate synthesized text by decoding the input text based on the attention information.

(A3) According some implementations of the method of A2, the input text is query text, and the synthesized text is keyword information that is based on the query text.

(A4) According some implementations of the method of A2, the input text is text contained in an identified web page, and the synthesized text is a reformulation of the text contained in the web page.

(A5) According to some implementations of the method of any of A1 or A2, the method is performed by at least one decoder block of a decoder.

(A6) According to some implementations of the method of A5, the decoder incrementally generates output tokens, each output token that is generated being added to decoder input information that is fed to the decoder for processing in a subsequent decoding operation.

(A7) According to some implementations of the method of A5, the decoder is a part of an encoder-decoder system, and wherein the shared KV information fed to each decoder block originates from an output of an encoder of the encoder-decoder system.

(A8) According to some implementations of the method of A5, the decoder is part of a standalone decoder system that does not include an encoder, and wherein the shared KV information fed to each decoder block originates directly or indirectly from output information produced by the decoder.

(A9) According to some implementations of the method of A5, decoder input information that is fed to the decoder includes input text that includes one or more input tokens, combined with one or more output tokens predicted by the decoder, and wherein the method applies the expedited processing path to the one or more input tokens of the input text, and applies another processing path to the one or more output tokens. The other processing path takes into consideration head-specific instances of key information and head-specific instances of value information.

(A10) According to some implementations of the method of A5, for a given beam setting, the decoder produces a plurality of candidate output tokens at a particular instance of time, and wherein the method subsequently processes the plurality of candidate output tokens using a same instance of shared KV information.

(A11) According to some implementations of the method of any of A1, A2, or A5, the operation of generating a plurality of instances of head-specific query information and the operation of generating a plurality of instances of probability information use the neural network to generate a product, for each representational subspace associated with a particular head, of the original query information, a head-specific query weighting matrix, and a head-specific key weighting matrix.

(A12) According to some implementations of the method of any of A1, A2, A5, or A11, the operation of generating attention information uses the neural network to generate a plurality of head-specific products, each head-specific product corresponding to a representational subspace associated with a particular head, and being computed as a product of a head-specific instance of probability information, the shared KV information, and a head-specific linear transformation matrix.

(A13) According some implementations of the method of A12, the operation of generating attention information sums together the plurality of head-specific products.

In yet another aspect, some implementations of the technology described herein include a computing system (e.g., the computing system 1402 of FIG. 14) for performing attention. The computing system includes a neural network that implements at least one attention mechanism (e.g., the attention mechanism 102 of FIG. 1). The attention mechanism has an expedited processing path (e.g., the expedited processing path 104) that is configured perform any of the methods described herein, e.g., any of methods A1-A13.

In yet another aspect, some implementations of the technology described herein include a computer-readable storage medium for storing computer-readable instructions. The computer-readable instructions, when executed by one or more hardware processors, perform any of the methods described herein, e.g., any of methods A1-A13.

More generally stated, any of the individual elements and steps described herein can be combined, without limitation, into any logically consistent permutation or subset. Further, any such combination can be manifested, without limitation, as a method, device, system, computer-readable storage medium, data structure, article of manufacture, graphical user interface presentation, etc. The technology can also be expressed as a series of means-plus-format elements in the claims, although this format should not be considered to be invoked unless the phase "means for" is explicitly used in the claims.

As to terminology used in this description, the phrase "configured to" encompasses various physical and tangible mechanisms for performing an identified operation. The mechanisms can be configured to perform an operation using the hardware logic circuitry 1014 of Section C. The term "logic" likewise encompasses various physical and tangible mechanisms for performing a task. For instance, each processing-related operation illustrated in the flowcharts of Section B corresponds to a logic component for performing that operation.

This description may have identified one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Further, the term "plurality" refers to two or more items, and does not necessarily imply "all" items of a particular kind, unless otherwise explicitly specified. Further, the descriptors "first," "second," "third," etc. are used to distinguish among different items, and do not imply an ordering among items, unless otherwise noted. The phrase "A and/or B" means A, or B, or A and B. Further, the terms "comprising," "including," and "having" are open-ended terms that are used to identify at least one part of a larger whole, but not necessarily all parts of the whole. Finally, the terms "exemplary" or "illustrative" refer to one implementation among potentially many implementations.

In closing, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, performed by a computing system, for generating attention information in a neural network having machine-trained weighting values, comprising, as part of an expedited processing path having plural subnetworks:

obtaining original query information;

obtaining shared key and value (KV) information and storing the shared KV information in a cache memory of a hardware processor of the computing system;

in a first subnetwork of the neural network, generating a plurality of instances of head-specific query information based on the original query information by linearly projecting the original query information using head-specific machine-trained query weighting matrices, the plurality of instances of head-specific query information being associated with a plurality of respective representational subspaces;

in a second subnetwork of the neural network, generating a plurality of instances of probability information based on a product of the plurality of respective instances of head-specific query information and the shared KV information; and in a third subnetwork of the neural network, generating the attention information based on the plurality of instances of probability information and the shared KV information, the attention information expressing an amount of attention to be paid to different parts of the shared KV information in interpreting the original query information, wherein said generating attention information uses the neural network to generate a plurality of head-specific products, each head-specific product corresponding to a representational subspace associated with a particular head, and being computed as a product of a head-specific instance of the plurality of instances of probability information generated by the second subnetwork, the shared KV information, a head-specific value weighting matrix, and a head-specific linear transformation matrix, and wherein said generating the plurality of instances of probability information and said generating the attention information being performed using the hardware processor of the computing system, and being performed by the plural subnetworks of the neural network without storing a plurality of instances of head-specific key information and a plurality of instances of head-specific value information in the cache memory of the hardware processor, and without generating the plurality of instances of the head-specific key information and the plurality of instances of head-specific value information by linearly projecting original key information and original value information using head-specific key and value machine-trained weighting matrices.

2. The method of claim 1, wherein the method further includes obtaining input text, and using a text generation system to generate synthesized text by decoding the input text based on the attention information.

3. The method of claim 2, wherein the input text is query text, and the synthesized text is keyword information that is based on the query text, and wherein the method further includes storing the keyword information, and serving information items based on the keyword information.

4. The method of claim 2, wherein the input text is text contained in an identified web page, and the synthesized text is a reformulation of the text contained in the web page.

5. The method of claim 1, wherein the method is performed by at least one decoder block of a decoder.

6. The method of claim 5, wherein the decoder incrementally generates output tokens, each output token that is generated being added to decoder input information that is fed to the decoder for processing in a subsequent decoding operation.

7. The method of claim 5, wherein the decoder is a part of an encoder-decoder system, and wherein the shared KV information fed to each decoder block originates from an output of an encoder of the encoder-decoder system.

8. The method of claim 5, wherein the decoder is part of a standalone decoder system that does not include an encoder, and wherein the shared KV information fed to each decoder block originates directly or indirectly from output information produced by the decoder.

9. The method of claim 5, wherein decoder input information that is fed to the decoder includes input text that includes one or more input tokens, combined with one or more output tokens predicted by the decoder, and wherein the method applies the expedited processing path to said one or more input tokens of the input text, and applies another processing path to said one or more output tokens, wherein the other processing path takes into consideration head-specific instances of key information and head-specific instances of value information.

10. The method of claim 5, wherein, for a given beam setting, the decoder produces a plurality of candidate output tokens at a particular instance of time, and wherein the method subsequently processes the plurality of candidate output tokens using a same instance of shared KV information.

11. The method of claim 1, wherein said generating a plurality of instances of head-specific query information uses the neural network to generate a product, for each representational subspace associated with a particular head, of the original query information, a head-specific query weighting matrix, and a head-specific key weighting matrix.

12. The method of claim 1, wherein said generating attention information sums together the plurality of head-specific products.

13. A computing system for performing attention, comprising:

a neural network having machine-trained weighting values that implements at least one attention operation using plural subnetworks, said at least one attention operation having an expedited processing path that is configured to operate by:

obtaining original query information;

obtaining shared key and value (KV) information and storing the shared KV information in a cache memory of a hardware processor of the computing system;

in a first subnetwork of the neural network, generating a plurality of instances of head-specific query information based on the original query information by linearly projecting the original query information using head-specific machine-trained query weighting matrices, the plurality of instances of head-specific query information being associated with a plurality of respective representational subspaces;

in a second subnetwork of the neural network, generating a plurality of instances of probability information based on a product of the plurality of respective instances of head-specific query information and the shared KV information; and in a third subnetwork of the neural network, generating attention information based on the plurality of instances of probability information and the shared KV information, the attention information expressing an amount of attention to be paid to different parts of the shared KV information in interpreting the original query information, wherein said generating attention information uses the neural network to generate a plurality of head-specific products, each head-specific product corresponding to a representational subspace associated with a particular head, and being computed as a product of a head-specific instance of the plurality of instances of probability information generated by the second subnetwork, the shared KV information, a head-specific value weighting matrix, and a head-specific linear transformation matrix, and wherein said generating the plurality of instances of probability information and said generating the attention information being performed by the plural subnetworks of the neural network without storing a plurality of instances of head-specific key information and a plurality of instances of head-specific value information in the cache memory of the hardware processor, and without generating the plurality of instances of the head-specific key information and the plurality of instances of head-specific value information by linearly projecting original key information and original value information using head-specific key and value machine-trained weighting matrices.

14. The computing system of claim 13, wherein the computing system includes a decoder, and wherein said at least one attention operation is a part of at least one decoder block of the decoder.

15. The computing system of claim 14, wherein the decoder is configured to incrementally generate output tokens, each output token that is generated being added to decoder input information that is fed to the decoder for processing in a subsequent decoding operation.

16. The computing system of claim 14, wherein the computing system includes an encoder-decoder system, wherein the decoder is a part of the encoder-decoder system, and wherein the shared KV information fed to each decoder block originates from an output of an encoder of the encoder-decoder system.

17. The computing system of claim 14, wherein the computing system includes a standalone decoder system that does not include an encoder, wherein the decoder is part of the standalone decoder system, and wherein the shared KV information fed to each decoder block in the decoder originates directly or indirectly from output information produced by the decoder.

18. The computer-readable storage medium for storing computer-readable instructions, the computer-readable instructions, when executed by one or more hardware processors, performing a method, using a neural network having plural subnetworks, that comprises:

obtaining input text; and generating synthesized text by decoding the input text, said generating synthesized text involving, in an expedited processing path, at least one attention operation comprising:

obtaining original query information;

obtaining shared key and value (KV) information and storing the shared KV information in a cache memory of a hardware processor of a computing system;

in a first subnetwork of the neural network, generating a plurality of instances of head-specific query information based on the original query information by linearly projecting the original query information using head-specific machine-trained query weighting matrices, the plurality of instances of head-specific query information being associated with a plurality of respective representational subspaces;

in a second subnetwork of the neural network, generating a plurality of instances of probability information based on a product of the plurality of respective instances of head-specific query information and the shared KV information; and in a third subnetwork of the neural network, generating the attention information based on the plurality of instances of probability information and the shared KV information, the attention information expressing an amount of attention to be paid to different parts of the shared KV information in interpreting the original query information, wherein said generating attention information uses the neural network to generate a plurality of head-specific products, each head-specific product corresponding to a representational subspace associated with a particular head, and being computed as a product of a head-specific instance of the plurality of instances of probability information generated by the second subnetwork, the shared KV information, ahead-specific value weighting matrix, and a head-specific linear transformation matrix, and wherein said generating the plurality of instances of probability information and said generating the attention information being performed by the plural subnetworks of the neural network without storing a plurality of instances of head-specific key information and a plurality of instances of head-specific value information in the cache memory of the hardware processor, and without generating the plurality of instances of the head-specific key information and the plurality of instances of head-specific value information by linearly projecting original key information and original value information using head-specific key and value machine-trained weighting matrices.

19. The method of claim 1, wherein the hardware processor is a graphics processing unit.

\*   \*   \*   \*   \*